(12) United States Patent
Brandt et al.

(10) Patent No.: US 9,495,134 B2
(45) Date of Patent: Nov. 15, 2016

(54) METHODS AND APPARATUS FOR CODE SEGMENT HANDLING

(75) Inventors: Joel R. Brandt, San Francisco, CA (US); Stephen W. Oney, Pittsburgh, PA (US)

(73) Assignee: Adobe Systems Incorporated, San Jose, CA (US)

( * ) Notice: Subject to any disclaimer, the term of this patent is extended or adjusted under 35 U.S.C. 154(b) by 626 days.

(21) Appl. No.: 13/592,153

(22) Filed: Aug. 22, 2012

(65) Prior Publication Data

US 2013/0074036 A1    Mar. 21, 2013

Related U.S. Application Data

(60) Provisional application No. 61/535,816, filed on Sep. 16, 2011.

(51) Int. Cl.
*G06F 9/44* (2006.01)
(52) U.S. Cl.
CPC .. *G06F 8/33* (2013.01); *G06F 8/73* (2013.01)
(58) Field of Classification Search
USPC .......................................................... 717/113
See application file for complete search history.

(56) References Cited

U.S. PATENT DOCUMENTS

| | | | |
|---|---|---|---|
| 5,883,639 A * | 3/1999 | Walton et al. | 345/473 |
| 8,261,235 B2 * | 9/2012 | Chapman | 717/109 |
| 8,468,494 B2 * | 6/2013 | Rude | 717/113 |
| 8,667,456 B1 * | 3/2014 | Czymontek | 717/100 |
| 8,701,084 B1 * | 4/2014 | MacDonald | 717/113 |
| 8,739,120 B2 * | 5/2014 | Moody et al. | 717/113 |
| 8,949,792 B2 * | 2/2015 | Paterson et al. | 717/124 |
| 2004/0061719 A1 * | 4/2004 | Barsness | G06F 8/73 715/760 |
| 2005/0283765 A1 * | 12/2005 | Warren | G06F 11/3409 717/131 |
| 2008/0270983 A1 * | 10/2008 | Ahadian | G06F 8/33 717/113 |
| 2008/0288922 A1 * | 11/2008 | Chapman | 717/123 |
| 2012/0084664 A1 * | 4/2012 | Torgerson | G06F 9/4443 715/747 |
| 2012/0246610 A1 * | 9/2012 | Asadullah et al. | 717/103 |

(Continued)

OTHER PUBLICATIONS

Thummalapenta, S. and T. Xie. PARSEweb: A Programmer Assistant for Reusing Open Source Code on the Web. In "Proceedings of ASE: IEEE/ACM International Conference on Automated Software Engineering" pp. 204-213, 2007.

(Continued)

*Primary Examiner* — Marina Lee
(74) *Attorney, Agent, or Firm* — Wolfe-SBMC

(57) ABSTRACT

Methods and apparatus for providing a user of a code editing tool with code segment examples tied to support tools, where the support tools may provide documentation or a code segment previewer. The documentation may be static or interactive and may provide a user with the option for using a builder interface to refine the specification or parameters of the inserted code example. The code segment previewer allows a user to preview only a subset of a larger body of a code base. Further, the code segment previewer may receive input identifying a segment of software code to be previewed, where the segment of software code is one of several other segments of software code.

20 Claims, 23 Drawing Sheets

(56) References Cited

U.S. PATENT DOCUMENTS

2012/0291012 A1* 11/2012 Robison et al. ............... 717/120
2013/0074036 A1* 3/2013 Brandt et al. ................. 717/113
2013/0198714 A1* 8/2013 Moody et al. ................ 717/113
2013/0326474 A1* 12/2013 Lane ............................. 717/107

OTHER PUBLICATIONS

Teevan, J., E. Cutrell, et al. Visual Snippets: Summarizing Web Pages for Search and Revisitation. In "Proceedings of CHI: ACM Conference on Human Facotors in Computing Systems." pp. 2023-2032, 2009.
Adar, E., M. Dontcheva, J. Fogarty, and D. S. Weld. Zoetrope: Interacting with the Ephemeral Web. In "Proceedings of UIST: ACM Symposium on User Interface Software and Technology." pp. 239-248, 2008.
Bajracharya, S., T. Ngo, et al. Sourcerer: A Search Engine for Open Source Code Supporting Structure-Based Search. In "Companion to OOPSLA: ACM SIGPLAN Symposium on Object-Oriented Programming Systems, Languages, and Applications." pp. 681-682, 2006.
Dontcheva, M., S. M. Drucker, D. Salesin, and M. F. Cohen. Relations, Cards, and Search Templates: User-Guided Web Data Integration and Layout. In "Proceedings of UIST: ACM Symposium on User Interface Software and Technology." pp. 61-70, 2007.
Goldman, M. Codetrail: Connecting Source Code and Web Resources. Journal of Visual Languages & computing, pp. 1-32, 2009.
Hartmann, B. Programming by a Sample: Rapidly Creating Web Applications with d.mix. In "Proceedings of UIST: ACM Symposium on User Interface Software and Technology." pp. 241-250, 2007.
Bergman, L, Castelli, V., Lau, T., and Oblinger, D. DocWizards: A System for Authoring Follow-me Documentation Wizards. In "Proc. UIST", (2005) pp. 191-200.

\* cited by examiner

Receive, through an interface of a code editor, an input selecting a code segment, where an editing window of the code editor displays a plurality of code segments
422

Insert, among the plurality of code segments, the code segment into the editing window
424

Display a visually demarcated region within context of the code segment
426

Invoke a support tool such that an interface for the support tool is within the visually demarcated region within the context of the code segment
428

FIG. 4A

```
<codelet name="CreateVar">                                    ──702
    <head>
        <title>Creating a var</title>                          ──708
        <description>creating a var</description>              ──710
        <keywords>create var</keywords>                        ──712
        <type>block</type>                                     ──714
        <language>javascript</language>                        ──716
    </head>
                                                               ──704
    <body>
        <example>                                              ──718
            var <mark id="name" /> = <mark id="value" />;     ──720
        </example>
                                                         ──722
            Name : <input type="text" id="name_inp"/><br/>
            Value : <input type="text" id="val_inp"/>          ──724

<script src = "jquery.js"/>
        <script src = "widgets.js"/>                           ──726
        <script>
            attach_input_to_mark($("#name_inp"), "name");
            attach_input_to_mark($("#val_inp"), "value");      ──728
        </script>
    </body>
                                                               ──706
</codelet>
```

FIG. 7A

```
<doc>
  <head>
    <title>Unicorn Link</title>
    <description>Unicorn Link</description>
    <keywords>unicorn link</keywords>
    <type>block</type>
    <lang>html</lang>
    <script type="text/javascript" src="docs/widgets/jquery.js"></script>
    <script type="text/javascript" src="docs/widgets/widgets.js"></script>
    <script>
      $(function() {
        attach_input_to_mark($("input[name='name']"), "page_name");
        attach_input_to_mark($("input[name='link_text']"), "link_text");
      });
    </script>
  </head>
  <body>
    <example><a href="#"><mark id='page_name'/>"><mark id='link_text'/></a></example>

This is a link in unicorn. Unicorn links are always a element.

Example text<br/>

</body>
</doc>
```

*FIG. 7B*

```
<html>
    <head>

</head>
    <body>
    ▛▔▜
    ▙▁▟ ~802
    </body>
</html>
```

*FIG. 8A*

```
<html>
    <head>

</head>
    <body>              804
    |              ⌒
    ▬▬▬▬▬▬▬▬▬▬▬▬
    </body>
</html>
```

*FIG. 8B*

```
<html>
    <head>
        <link rel+"stylesheet" href="include/jquery.mobile.css" />
        <script type="text/javascript" src="include/jquery.js"> </script>
        <script type="text/javascript" src="include/jquery.mobile.js"> </script>
    </head>
    <body>
        <div data-role="page" id=" ">

<div data-role="header">
                <h1></h1>
            </div>

<div data-role="content">
                <a data-role="button" href=" " data-icon='plus' data-iconpos='top'>
                push me</a>
            </div>

<div data-role="footer">
                <h4></h4>
            </div>

</div>
```

ⓧ ⊖ ⊕  jLibrary Mobile Pages  ▶
Overview  The jLibrary Mobile "page" structure is optimized to support either single
Preview    pages, or local internal linked "pages" within a page. The goal of this
           model is to allow developers to create websites using best practices –
           where ordinary links will "just work" without any special configuration –
           while creating a rich, native-like experience that can't be achieved with
           standard HTTP requests .

```
    </body>
</html>
```

FIG. 11

```
<html>
    <head>
        <link rel+"stylesheet" href="include/jquery.mobile.css" />
        <script type="text/javascript" src="include/jquery.js"> </script>
        <script type="text/javascript" src="include/jquery.mobile.js"></script>
```

⊗ ⊖ ⊕ Link jLibrary Mobile
Include jLibrary mobile.

```
    </head>
    <body>
        <div data-role="page" id=" ">

<div data-role="header">
                <h1></h1>
            </div>

<div data-role="content">
                <a data-role="button" href=" " data-icon='plus' data-iconpos='top'>
                    push me</a>
            </div>

<div data-role="footer">
                <h4></h4>
            </div>

</div>
```

⊗ ⊖ ⊕ jLibrary Mobile Pages ▶

Overview
Preview

The jLibrary Mobile "page" structure is optimized to support either single pages, or local internal linked "pages" within a page. The goal of this model is to allow developers to create websites using best practices – where ordinary links will "just work" without any special configuration – while creating a rich, native-like experience that can't be achieved with standard HTTP requests.

```
    </body>
</html>
```

```
<html>
<head>
</head>
<body>
<div data-role="page" id=" ">

<div data-role="header">
        <h1></h1>
    </div>

<div data-role="content">        1502
                        ┌─────────────────────────┐
                        │ button|              ↵  │
                        │ jLibrary Mobile Buttons │
                        │ Internet search 'button'│ ⌘2
    </div data-role= footer >──────────────────┘
        <h4></h4>
    </div>

</div>
```

▲

⊗ ⊖ ⊕ jLibrary Mobile Pages

Overview  *The jLibrary Mobile "page" structure is optimized to support either single pages, or local internal linked "pages" within a page. The goal of this model is to allow developers to create websites using best practices – where ordinary links will "just work" without any special configuration – while creating a rich, native-like experience that can't be achieved with standard HTTP requests.*

Preview

```
</body>
</html>
```

902

904

METHODS AND APPARATUS FOR CODE SEGMENT HANDLING

PRIORITY INFORMATION

The present application claims priority to U.S. provisional patent application No. 61/535,816, filed Sep. 16, 2011, which is herein incorporated by reference in its entirety.

BACKGROUND

Code editors provide a development environment within which software developers may write software code to build, among other things, software applications or libraries. Software developers frequently use snippets or segments of example code found in various sources. However, while example code may be presented to a user within the framework of explanatory documentation where the example code was found, example code inserted into a code editor lacks any link or interactivity to the documentation corresponding to the example code. As a consequence, within current code editing tools, when a user searches for example code or documentation, the found documentation and example code segments are merely located and displayed independently of the code under development.

Many code editing tools allow a user to display a preview of code under development. However, the preview ability of current code editors is based on generating a preview for an entire body of software code. Thus, while current code editing tools may provide a user the ability to preview the results of software being developed, the preview is holistic. In other words, a software developer sees a preview of each and every aspect of the code under development similar to a runtime output of the code. However, in some cases, a software developer may find it advantageous to preview a particular segment or subsection of the code under development.

SUMMARY

In one embodiment, using a code editor, one or more code segments may be inserted into a code base such that the one or more code segments are tied or linked to documentation that is persistently associated with the one or more inserted code segments. In some embodiments, to begin, a user input selection is received through an interface of a code editor. The user input selection is used as the basis for determining one or more code segments, and in response to determining the one or more code segments, the one or more code segments are inserted into a code development window displayed within the code editor. The one or more inserted code segments may correspond to documentation for the one or more code segments. Further, in response to user input corresponding to the one or more inserted code segments, the documentation for the one or more code segments may be displayed.

In one embodiment, a code segment previewing tool may be implemented within a code editor to allow a user to preview only a subset of a larger body of a code base. For example, a code editor may display a plurality of code segments, and receive input identifying a segment of code from among the plurality of code segments displayed in the code editor. The code segment previewing tool may then display a preview of the segment of software code.

BRIEF DESCRIPTION OF THE DRAWINGS

FIGS. 4A-4C are flowcharts of embodiments of receiving input indicating a software code component and providing one or more code segments.

FIGS. 7A and 7B depict illustrations of embodiments of documentation packages, according to some embodiments.

FIG. 8A depicts a code editing region from which a search box may be invoked, according to some embodiments.

FIG. 8B depicts a code editing region from which a search box is invoked, according to some embodiments.

FIG. 11 depicts an illustration of a hidden state of a documentation package corresponding to code segments, according to some embodiments.

FIG. 14 depicts an illustration of user interface elements of an interactive documentation region, according to some embodiments.

FIG. 15 depicts an illustration of nested insertion of documentation packages, according to some embodiments.

Figure 1:
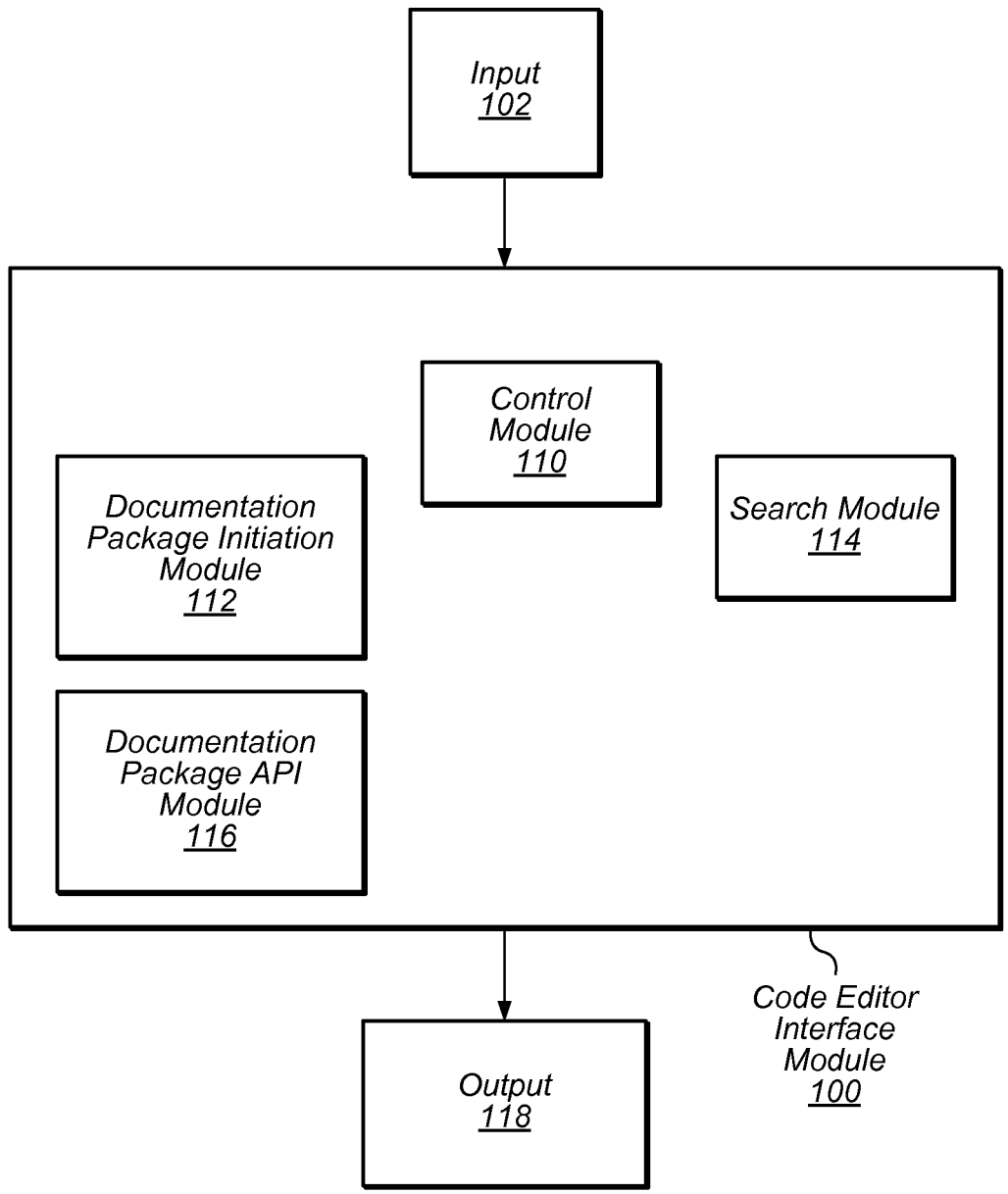
FIG. 1 illustrates a module that may implement a code editor interface module, according to some embodiments.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments are presented of documentation linked to or made to correspond to one or more code segments, code editor modifications to enable support for the correspondence or link between the documentation and one or more code segments, and a software code segment preview tool.

Example code provides a useful starting point for software developers in developing new software. Example code may also serve an instructional purpose by providing a software developer with a reference to functional code, instead of simply descriptive documentation. Further, example code often allows code developers to avoid errors given that example code has often been tested and may be considered reliable. However, current sources of example code and current sources of documentation are not bound together or linked together in any way, much less any kind of interactive way. In other words, a user may search for and insert example code, but any relevant documentation for the sample code exists independent of the example code without any correspondence between the documentation and the example code.

Further, while current software development tools may provide a user with the ability to search for documentation on a software code feature, current software development tools fail to provide a software developer with the ability to access documentation that is persistently associated with any code segments inserted into the code base of a code editor. A code feature may be any programming language call, definition, or statement that serves as a basis for implementing a particular aspect of an executable software program. For example, when developing HTML code, a user may be interested in inserting HTML code for implementing a button within the code under development. In this example, a relevant code feature may be a library call for implementing a button, where a relevant library call is myButton( ) and the parameters to myButton( )serve to define the size, shape, color, and behavior of the button. In this example, to use the myButton( )code feature, a user would need to know to include a particular library providing the myButton( )call, the user would also need to know that the relevant library function is myButton( ) and the user would need to know that number and types of parameters necessary to call myButton( )—in addition to needing information on what kind of supporting code may be necessary to handle information from the myButton( )call. Similar code features exists for any given programming language, and the code feature may also be intrinsic to the programming language. Given this example, it becomes evident how an interactive system for allowing a user to simply perform a keyword search at a given point in the user's code base, where the options presented to the user allow the user to insert relevant sample code along with an interactive user interface for specifying the elements of the sample code and relevant documentation for the sample code. A code sample may be any number of programming language definitions or statements.

In one embodiment, a code editor may be modified to support an application programming interface (API) to enable communication with a variety of executable software packages or components associated with one or more segments of example code. In other words, the example code within the code editor is not simply text, but rather the example code corresponds to an executable software component, where the executable software component communicates with the code editor through the API to provide a user with a variety of features and tools for supporting the documentation or modification of the corresponding example code.

In some embodiments, the executable software component may be implemented in HTML or JavaScript, however, in general terms, the executable software component may be implemented in any programming language and is herein referred to as a documentation package, an interactive documentation package, or a documentation software package.

In some embodiments, through the persistent association of a documentation package with example code inserted into a code editor and through the communication of the documentation package with the code editor through the API, interactive or static documentation for the example code may be enabled. Further, the documentation package may provide a variety of support tools related to the example code, for example, code segment previewing or code builder tools.

In some embodiments, a documentation package interface plugin may be installed into an existing code editor in order to provide the code editor with the functionality to communicate with and support documentation linked to code segments. In some examples, the documentation package interface plugin may enable the code editor to provide the framework for writing and creating documentation packages. The documentation package interface plugin may provide an application programming interface (API) to enable communication between a given documentation package and the code editor. In other embodiments, the functionality described with respect to the documentation package interface plugin may be incorporated into a build of the code editor, and thereby resulting in a code editor with native support of the documentation package interface plugin. In such an example, the modified code editor provides all support for providing interactive documentation to a user.

Embodiments of documentation packages may take the form of a software package installed into a code editor to enable user interactions with a portion of code that is part of a larger code base managed by the code editor. For example, a documentation package may instruct a code editor to display a segment of code such that the segment of code is visually demarcated, and further, to display documentation information within the visually demarcated segment of code. In this example, the displayed documentation may be visible within the visually demarcated code segment, however the displayed documentation would not itself be part of the body of the software under development, only the code segment would be part of the body of the software under development. However, the contextual visual association of documentation with corresponding code provide the user with more immediate information regarding the code, and in this way the user is saved any lost time switching contexts. In some embodiments, the documentation is static or unchanging and in other embodiments, the documentation is interactive.

In other words, by having the displayed documentation visible within the visually demarcated area, a user may be provided with information directly pertinent to the code segment within the same context as the code segment—in this way, a user avoids a context switch from the code editor to some other third party source for documentation, which may increase the efficiency of code development. Further, given that the code segment and the interactive documentation are visible within the same demarcated area, the user is saved from a context switch even from within the same code editor. Within the visually demarcated area, a user may be given information indicating that the given code segment requires certain parameters, certain include files, and produces a certain effect. In some embodiments, instead of enabling a code editor to support interactive documentation through the installation of a software package, the functionality may be integrated, or built-in to a given code editor.

A code editor supporting interactive documentation may provide a user with a method for searching for example code and once example code is inserted into the code base, the example code may be persistently associated with one or more interactive documentation packages. In some embodiments, prior to insertion of a corresponding example code segment, an interactive documentation package may modify the content of the code segment depending on the context within the body of the software under development the code segment is to be located. The interactive documentation package may apply modifications to the example code segment to make the example code segment consistent with surrounding code. In some examples, if a code segment is subsequently moved, and the code segment corresponds to a documentation package, the documentation package may query the code editor to determine the context of the new location of the code segment. In this example, based on the context of the new location of the code segment, the documentation package may automatically modify one or more elements of the code segment in response to the new context.

In some embodiments, the documentation package may automatically change variable names or determine whether additional surrounding code should be inserted along with the insertion of the code segment. For example, if the scope of a variable within the code segment overrides the scope of an existing variable, the variable within the code segment may be renamed to preserve the current scope of the existing variable. Further, upon a determination to insert additional surrounding code, the documentation package may automatically introduce one or more new code segments into the body of software code under development. In other embodiments, the new code segments are presented to a user for approval or for modification before any code segments are inserted. In some embodiments, upon the move of a software code segment with a corresponding documentation package, the documentation package may determine the removal, addition, or modification of one or more code segments of the code segment to ensure consistency with the context of the new location.

In other embodiments, the documentation package may modify a corresponding code segment based not on a functional basis, but on a stylistic or aesthetic basis. For example, code developers often have a coding style that makes certain uses of capitalization, spacing, indenting, comment styles, or use of white space within coding structures. Often, after a software developer inserts code from another source, the style of the copied code is modified to be consistent with the software developer's style. In some embodiments, a user may define a preferences file, which a documentation package may access to reformat the code segment to be inserted. In other embodiments, the documentation package may communicate with the code editor to retrieve other parts of or the entire code base in order to automatically analyze the code base for stylistic elements, including those listed above among others, which may then be automatically applied to the code segment.

In other embodiments, upon a move or insertion of a code segment corresponding to a documentation package, the documentation package may issue a warning if the code segment requires modifications or additions that may require user intervention. For example, if the documentation package detects an incompatibility that cannot be fixed with a modification or addition to the code segment, the user may be warned of the problem. In other embodiments, the documentation package may provide a warning that the result of the move of the code segment is syntactically valid, but that the new location of the code segment is contrary to or fails to meet conventional coding techniques that include the code segment—a warning that also applies when the code segment is inserted into the code base. In other examples, the documentation package may warn the user that one or more libraries should be included or that one or more settings should be made as a result of the move or insertion of the code segment.

In some embodiments, a documentation package may include one or more code segment examples that may be inserted into a user's code. In addition to the one or more code segment examples, the documentation package may include explanatory text tailored to each of the one or more code segment examples, or simply one overall explanatory text applicable to all of the code segment examples. In some embodiments, graphical images may be included within the body of a documentation package, and one or more of the graphical images may be presented to a user alongside or as a substitute for the explanatory text. In some embodiments, animated sequences may provide instruction or depictions of the code segment being modified.

In some embodiments, a code editor modified to support interactive documentation packages may track each code segment within a body of software under development in order to maintain the correspondence between a given code segment and a given documentation package. The correspondence may be maintained persistently through closing and opening the code editor once the correspondence between a code segment and documentation exists. In this embodiment, the code editor assumes this tracking role given that only a segment of example code from the documentation package is incorporated into the body of software under development and not the accompanying explanatory information, other possible example code segments, or the executable code of the documentation package itself. In this way, when a user moves or copies the example code segment inserted from one location to another, the functionality enabled by the corresponding documentation package is maintained.

In some embodiments, inserted example code corresponding to a documentation package may span several blocks or regions of code. Further, a given segment of example code inserted and corresponding to the documentation package may be expanded when a user introduces additional code segments or when the user selects a replacement code example segment. In some cases, a user may first select an initial code segment example and begin to modify various elements of the code segment example, such as parameter values. If at some later point in time the user decides to select a different code segment example provided by the documentation package, to the extent possible, each of the user modifications to the initial code segment example are transferred to the new code segment example selected by the user. For example, if a similar parameter exists in both the initial and new code segment example of the documentation package or of a new documentation package, when the new code segment example replaces the initial code segment example, the new code segment example may be inserted such that the parameter value is set or defined as it was in the initial code segment example. Similarly, in some embodiments, if the user introduces additional code, additional parameters, or additional settings to an initial code segment example, to the extent possible or syntactically compatible, the user additions are transferred to the new code segment example.

In some embodiments, a documentation package may present explanatory information accompanying a code segment example in a variety of ways. In one example, the code segment example may be visually demarcated within a code editor and explanatory text may be displayed within the visual demarcation along with the code segment example. While the explanatory text may be visible within the visual demarcation, and while the entire visually demarcated region may appear to a user to be within the body of the software code under development, only the code segment example is part of the software code under development. In another example, different pieces of explanatory information may be displayed to a user as a user hovers a mouse over different areas of the example code segment provided by the documentation package. In another example, a single body of explanatory material may be displayed along with the display of the example code segment, and as a user selects different portions of the explanatory material, a corresponding section of the example code segment may be highlighted. Conversely, in this example, as a user selects or hovers over different sections of the example code segment, different areas of the displayed explanatory material that correspond to the particular section may be highlighted.

In other embodiments, for a given example code segment inserted into the body of software code under development, the documentation package may draw on a display, or direct the code editor to draw on the display, arrows from one or more portions of the explanatory material to one or more relevant sections of the example code segment. In other examples, a user may select to display line numbers alongside the example code segment, and if such a selection is made, then the documentation package may insert references to line numbers within the explanatory material for the example code segment. The selection to display line numbers alongside the example code segment may be received via a user interface element displayed with the explanatory material, and the option may be toggled on or off.

In the following detailed description, numerous details are set forth to provide a thorough understanding of the claimed subject matter. However, it will be understood by those skilled in the art that the claimed subject matter may be practiced without these specific details. In other instances, methods, apparatus or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Code Editor Interface Module

FIG. 1 illustrates an embodiment of a Code Editor Interface Module 100. The Code Editor Interface Module 100 may be installed through a plugin for a code editor or natively supported by a code editor to provide the code editor with the functionality to communicate with one more interactive documentation packages. In some embodiments, as noted above, communication from a code editor to a documentation package is enabled through an API.

Interactive or static documentation packages, as described above, may be invoked and communicate with the code editor in order to determine appropriate example code to provide for insertion. In some embodiments, Code Editor Interface Module 100 may search for and load a documentation package in response to user input, and once the documentation package is executing, communicate with the documentation package.

In some embodiments, Control Module 110, as executed from the code editor, receives user input 102, which may indicate the type of example code the user is searching for or may specifically indicate a particular coding element. For example, in the case of HTML programming, a user may search for example code corresponding to a type of user interface element. In such a case, Code Editor Interface Module 100 may interpret the user search parameters to determine one or more documentation packages that are configured to provide the example code. When the determined documentation packages are loaded, the loaded documentation packages may communicate through the Code Editor Interface Module 100 to present to the user one or more example code segments that may provide the example code for which the user was searching such that the presented example code segment is appropriate to the point within the code base where the user intends to insert the example code. Whether the example code segment is appropriate may be determined through the documentation package querying Code Editor Interface Module 100 to request contextual information from the code editor regarding the point in the code base into which the example code segment or segments are to be inserted. In other cases, there may only be one appropriate example code segment to insert, and therefore, without any further prompting from the user, the specified example code may be inserted. In other cases where there is more than one example code segment that is appropriate, the documentation package may automatically select from context or from other factors, such as popularity or according to best coding practices, the example code segment to insert.

Code Editor Interface Module 100 may be invoked in a variety of different ways. In one example, from a given point within a body of code, a user may initiate a search and enter one or more search terms. The code editor, through the Code Editor Interface Module 100, may communicate with a documentation package or packages to determine a list of relevant documentation packages and the user may simply select an example code segment from the list. In some cases, the list may be displayed in a panel within the code development environment, for example, adjacent to an editing window, and upon a user selection of a documentation package, example code is inserted at the location of a cursor at the time the selection was made. Other methods of providing input to determine an appropriate documentation package are similarly possible, for example, right-clicking on a mouse, or through a keystroke combination, at a point within the code editing interface window in order to display a menu of documentation package options with information on what types of code segments are provided by the documentation package.

Given input 102, Control Module 110 may invoke Search Module 114 to determine an appropriate documentation package or packages based on input 102. A determination of a documentation package or packages may be returned to Control Module 110.

Once determined, Documentation Package Initiation Module 112 may load and invoke the documentation package. Once executing, the documentation package may communicate with the code editor through Code Editor Interface Module 100 via Documentation Package API Module 116.

Execution of the documentation package may generate or modify example code that is then inserted into the user's working code either through the executing documentation package or through the code editor based on information or instructions received from the documentation package. In this way, in this embodiment, the process that began with the user selecting or searching for documentation results in example code being inserted into the user's working body of software code, where the example code corresponds to interactive documentation.

Documentation Package Module

Figure 2:
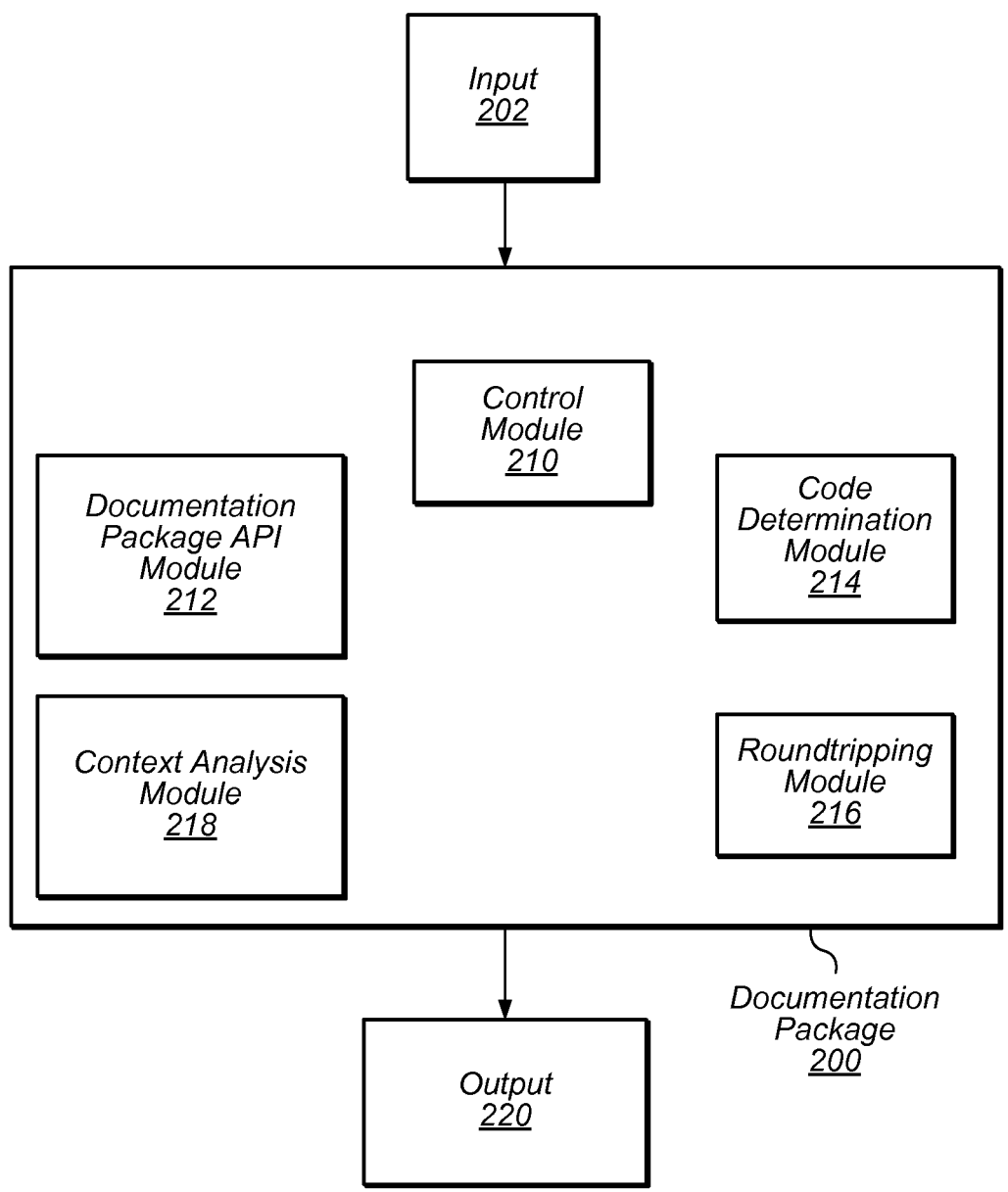
FIG. 2 illustrates a module that may implement a documentation package module, according to some embodiments.

FIG. 2 illustrates an embodiment of a Documentation Package Module 200. Documentation Package Module 200 may be an executable software component implementing a documentation package that is compatible with and loadable from a code editor.

As described above with respect to Code Editor Interface Module 100, a documentation package may be invoked by a code editor upon receiving input corresponding to example code. At some point after a user indication, Code Editor Interface Module 100 may invoke Documentation Package Module 200 and provide input 202. Input 202 may be simply the input provided by a user, or input 202 may be determined by Code Editor Interface Module 100 before Code Editor Interface Module 100 invoked Documentation Package Module 200. In other cases, input 202 may be a combination of user input and input provided by Code Editor Interface Module 100.

Control Module 210 may provide Code Determination Module 214 with input 202 in order for Code Determination Module 214 to determine appropriate example code in response to input 202. In some cases, Code Determination Module 214 may query Code Editor Interface Module 100 via Documentation Package API Module 212 in order to acquire additional information regarding the context into which example code is to be inserted. In some embodiments, Code Determination Module 214 may communicate context information received with Context Analysis Module 218 in order to determine the appropriate example code to return, and in some cases, to determine whether additional supporting code is to be returned in addition to the example code.

The context analysis may determine appropriate example code without any compilation of the code. For example, a user may wish to insert a user interface element, however, in addition to example code appropriate to the user interface element a library file should also be included, and the code for including the library file is also returned to the user. In other examples, the additional information may be a warning or suggestion based on either the example code alone, or based on a combination of the example code within the context of the user's current body of software under development. In the case that additional code segments are determined such as insert or include files, the additional code segments may be inserted in a location of the code base that is not adjacent to the example code requested, however, the additional code segments remain associated with the example code and the documentation package. Other types of information may also be returned as output 220.

Once a documentation package is executing, a user may interact with the documentation package via modifications to the example code corresponding to the documentation package, or through user selections of interface elements provided by the documentation package. Roundtripping Module 216 may receive user modifications to user interface elements corresponding to the example code and may modify the example code to match any modifications made through the user interface elements. Similarly, changes made to the example code may be reflected within any user interface elements provided according to the documentation package. The real-time synchronization of information for these two methods of receiving user modifications is referred to as roundtripping.

Therefore, depending on the current operating context of the documentation package, Output 220 may be, among other types of output discussed below, example code, warnings, suggested tips, or example code updates, or user interface element updates.

Segment Preview Generation Module

Figure 3:
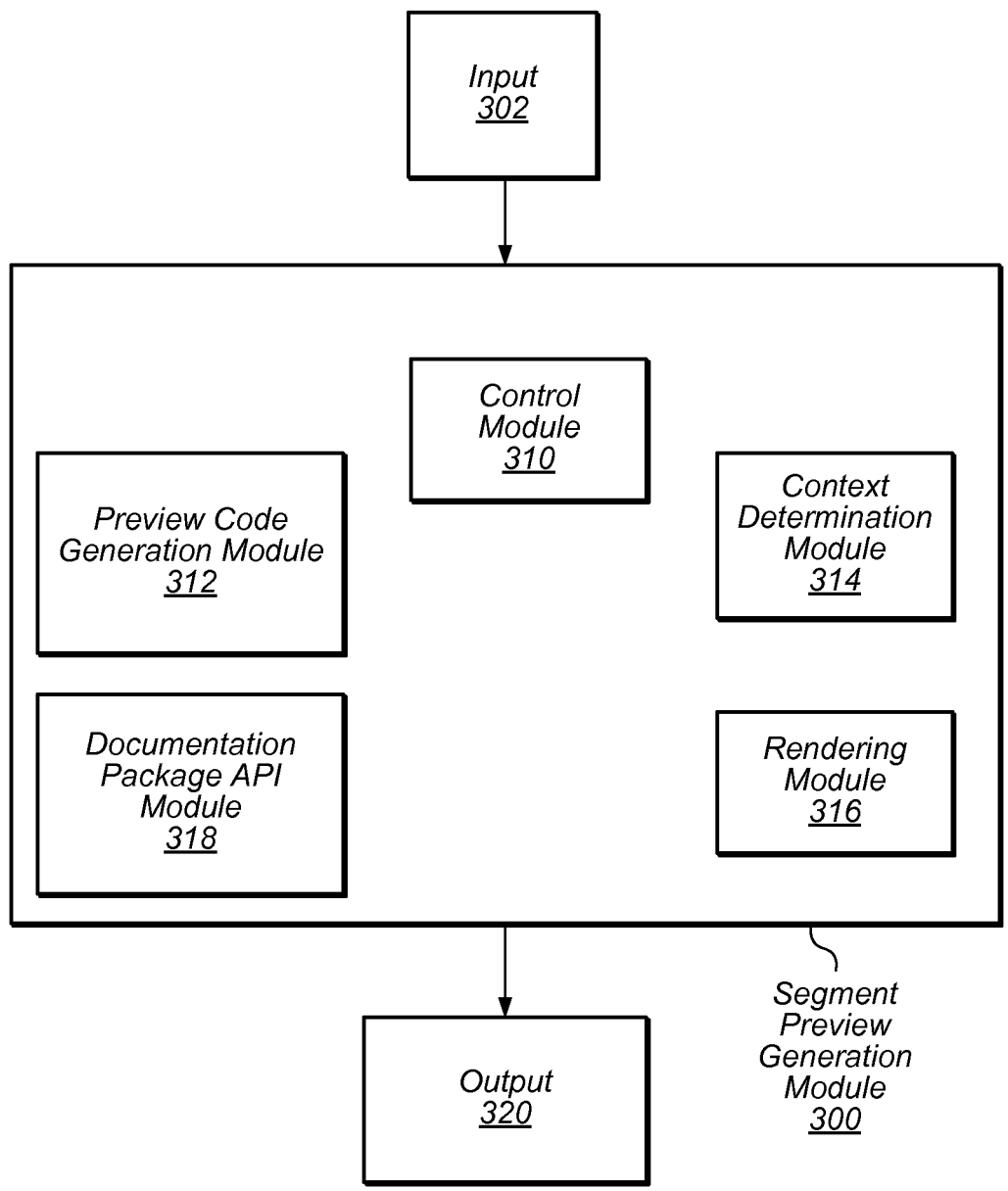
FIG. 3 illustrates a module that may implement a segment preview generation module, according to some embodiments.

FIG. 3 illustrates an embodiment of a Segment Preview Generation Module 300. The functionality of the Segment Preview Generation Module 300 may be incorporated natively into a code editor, as a plugin to a code editor, into Code Editor Interface Module 100, or into Documentation Package Module 200.

Input 302 may be example code corresponding to a documentation package, or input 302 may be any of one or more code segments without an association with a documentation package, or input 302 may be one or more references to one or more segments of code. For example, in some cases, a user may highlight any of one or more code segments and right-click to invoke a segment preview option. In other embodiments, example code may be visually demarcated and may correspond to a documentation package. In this case, the documentation package may provide a user interface element, such as a preview icon, selectable by a user to invoke a preview of the example code corresponding to the documentation package.

Other methods of providing a segment of code are possible. Further, in other cases, a single function or set of functions may be selected for segment previewing. Further still, a user may indicate a beginning point and an ending point within a code base such that all code segments between the beginning and ending indication points is previewed. In this case, Segment Preview Generation Module 300 may generate a preview for all code segments between the beginning and ending markers, or for code segments that would be within the flow of execution between the beginning and ending markers.

Given input 302, Control Module 310 may invoke Preview Code Generation Module 312 to generate preview code in response to user input 302. In some cases, input 302 may be a segment of code that does not require additional supporting code before a preview can be generated. In other cases, Preview Code Generation Module 312 may invoke Context Determination Module 314 to determine whether additional code segments are necessary or appropriate to provide context to the input code segment or segments. The determination of whether additional code segments are necessary or appropriate may be performed without any compilation of the code segments or without any compilation of the larger code base. In such a case, Context Determination Module 314 may use Documentation Package API Module 318 in order to query the invoking process for additional information regarding the code segment and return any results to the Preview Code Generation Module 312.

Output 320 may be graphical information produced by Rendering Module 316 based on the preview code generated by Preview Code Generation Module 312, where the graphical information may be provided to a display by the process invoking Segment Preview Generation Module 300, or some other process, in order to produce the preview. In other embodiments, Rendering Module 316 may directly provide data to a display in order to display a preview of the preview code generated.

Documentation Packages

Figure 4B:
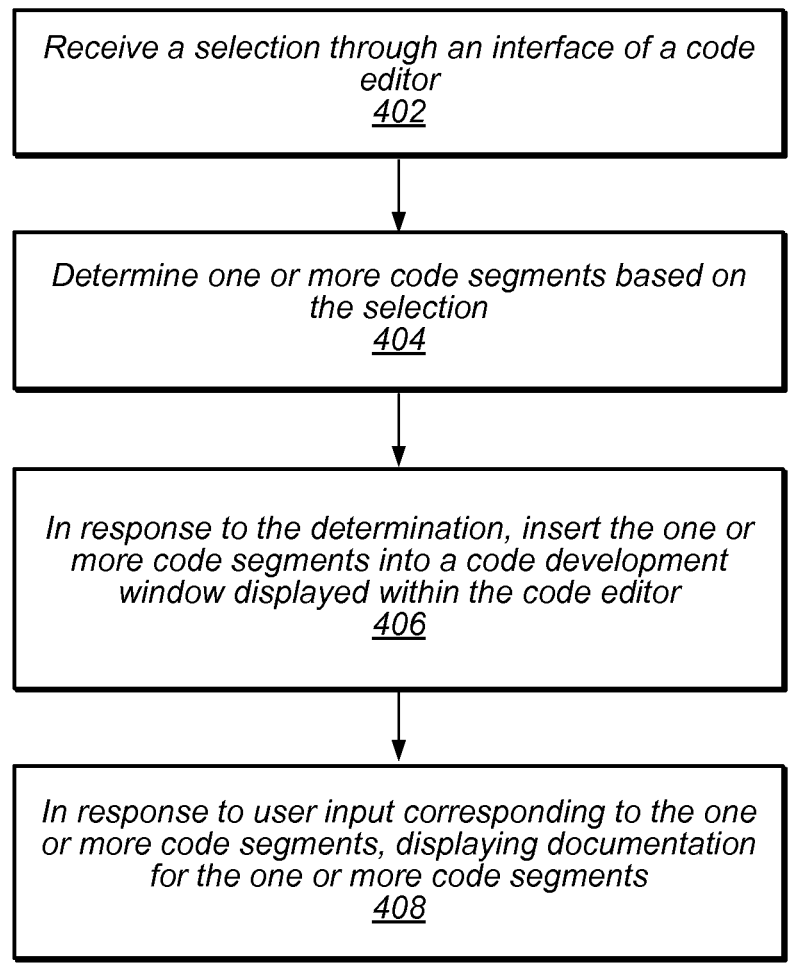
Figure 4C:
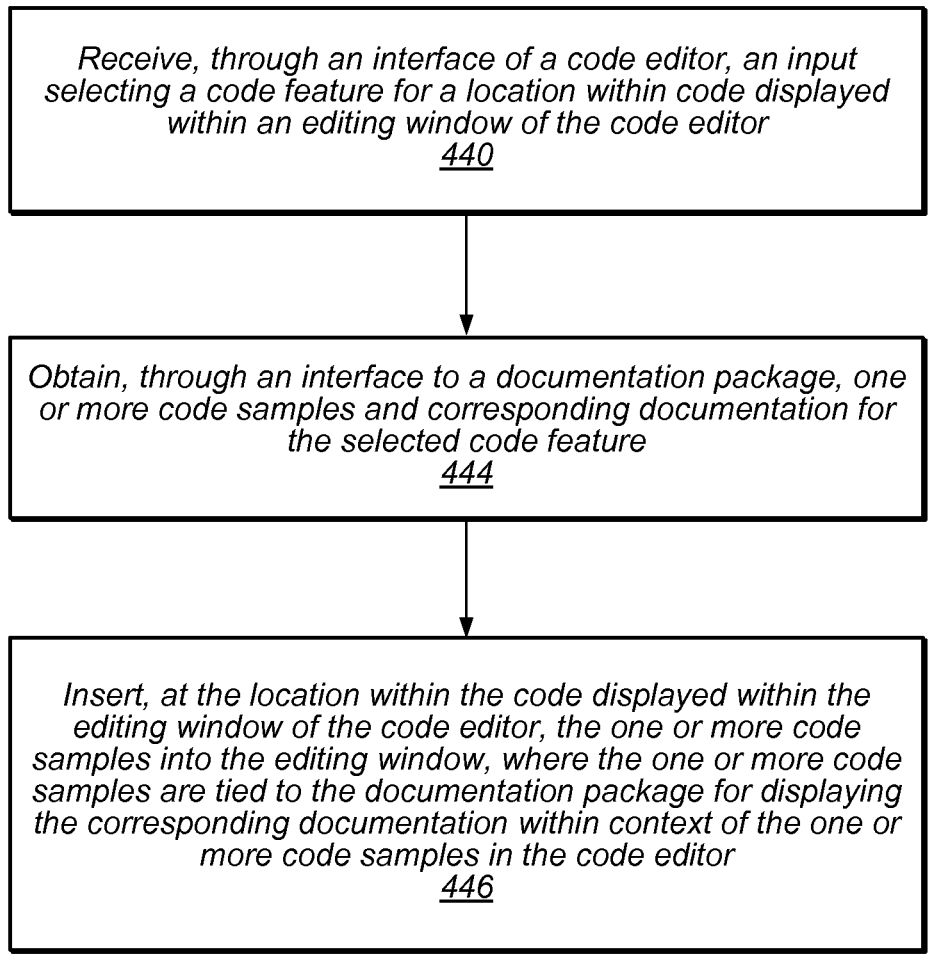

FIGS. 4A-4C illustrate flowcharts highlighting example processing steps that may be present in embodiments of a documentation package operating in conjunction with a code editor or embodiments where a code editor is capable of performing each of the functions described in regard to the documentation packages. In some embodiments, a documentation package, once executing, may receive data from the code editor through an API.

As per FIG. 4C, a code editor may receive input selecting a code feature for a location within existing code displayed within an editing window of the code editor, where the input selection is made through a user interface of the code editor, as reflected at stage 440. In some cases, the user interface may be invoked at a point within the code editor where a user would otherwise enter code manually, for example at a cursor location within the code editing window a user may invoke a search interface. The search interface may be invoked through various input methods, and two examples are through a key combination or clicking a mouse button. Once a user is presented with the search interface, the user may enter a term or keyword for a code feature.

In some cases, where a documentation package operates in conjunction with the code editor, for example through the installation of a plugin, the code editor may obtain through an interface with the documentation package one or more code samples and documentation corresponding to the one or more code segments for the selected code feature. For example, the selected code feature may be transmitted to the documentation package through an application programming interface and in this case, the documentation package serves as the documentation source. Further, the documentation package may use the selected input as the basis for determining the one or more code samples sent to the code editor for insertion into an editing window.

Once the code editor has received the one or more code samples, the code editor may insert the one or more code samples into the editing window, where the one or more code samples are tied to the documentation package in order for displaying the corresponding documentation within context of the one or more code samples in the code editor, as reflected in stage 446. Further reflected in stage 446 is that the one or more code samples are inserted within the code editor at the location within the editing window of the code editor where the code feature was selected.

In some embodiments, the tie between the code samples and a documentation package is maintained with mapping information that includes information for a given documentation package and corresponding characters in the code editor that have been inserted through the above-described process for inserting example code, such as through the search interface invoked within the code editor user interface. In this way, for a given set of characters corresponding to code within the code editor, a given documentation package tied to the code may be identified with a lookup operation of the mapping operation using the characters within the code as an index into the mapping information. Similarly, when the documentation package is the source of a communication or change, the mapping information may be used to identify the characters corresponding to one or more code samples in the code editor corresponding to the documentation package, where the documentation package serves as an index into the mapping information.

As per FIG. 4A, a documentation package receives, through an interface of a code editor, a user input selection indicating one or more code segments, where an editing window of the code editor displays multiple code segments, as reflected in stage 422. For example, within a code editing window a user may decide to insert example code, and at the point the user intends for the example code to be placed, the user may invoke a user interface that allows the user to indicate a selection of a code example. In some cases, the user interface may be invoked at the current position of a cursor or pointer, and the indication of a selection of a code example may be determined interactively. The interactive determination of an example code segment may begin with a user entering a search term, for example "button". In other cases, the user may navigate various menus to narrow down the type of example code for which the user is searching.

Once one or more code segments have been determined, the one or more code segments may be inserted into the editing window, as reflected in stage 424. At the point that the one or more code segments are inserted into the code editing window, the one or more code segments become part of the existing code base, made up in part from the other existing code segments already displayed in the code editing window.

In some cases, the inserted one or more code segments may be displayed within context of a visually demarcated region, as reflected in stage 426. In some cases, the visually demarcated region may only become visible when the user hovers over or otherwise invokes the visually demarcated region to be displayed.

The visually demarcated region may include one or more user interface elements through which a user may invoke various support tools or display options. For example, the user may invoke a support tool such that an interface for the support tool is within context of the visually demarcated region, where the visually demarcated region is itself within the context of the one or more inserted code segments, as reflected in stage 428.

As per FIG. 4B, a documentation package receives input indicating a selection made through an interface of the code editor, as reflected in stage 402.

The input selection may be an indication of the type of code a user is attempting to insert into a body of software. For example, the input selection may indicate a certain type of button, or more specifically, a certain type of button from a particular library. In some embodiments, the input selection may be one or more terms entered by a user describing the type of example code wanted. In this case, based on the one or more terms, the documentation package may determine one or more segments of example code from multiple options satisfying the one or more terms, as reflected in stage 404.

In some embodiments, the documentation package may determine that multiple, different options for example code to insert match the one or more terms entered by the user describing the type of example code wanted. In such a case, the multiple options may be provided for display to a user as options to be selected.

Further, in the case that there is more than one possible set of example code segments satisfying the criteria of the received input selection, the documentation package may provide an interactive interface to guide the user in selecting the appropriate code segment, such as through a series of questions presented to the user to determine the goal or purpose of the example code segment.

Once the one or more code segments are determined, in response, the one or more code segments are provided to the code editor for insertion into the user's code base and for display within the code development window of the code editor, as reflected by step 406.

In addition to the determination of one or more code segments, the documentation package may, in some embodiments, initialize the one or more code segments with default values and settings prior to insertion. In this embodiment, the documentation package may query the code editor via the API to obtain information on existing code and settings present within the context of the software code under development. In this embodiment, based on the returned information, the documentation package may determine initial values and initial settings.

In some embodiments, the determined one or more code segments, upon insertion into a user's code is visually demarcated. In this case, the user is presented with user interface elements corresponding to the inserted example code segments that enable the user to select options for interacting with the example code. Various interactions are possible between a user and a documentation package, and some of these interactions are described below. One example interaction, reflected in step 408, is where a user selects an input element to display the documentation corresponding to the one or more code segments inserted into the code editor. In some cases, a subsequent selection of the input element toggles the display of the documentation and results in the documentation being hidden.

In some embodiments, the functionality of the herein described documentation packages may be incorporated in the a code editor such that documentation relevant to an arbitrary code segment is determined at the time a user indicates the code segment. Once given a selection of a given code segment, the code editor may analyze the code segment to determine relevant documentation and present the documentation in the same context as the code segment, for example, by drawing a visually demarcated region around the code segment and displaying the documentation within the visually demarcated region. For example, a user may hover a cursor over a segment of code, and upon a right click or some other user input, the code editor may respond with an option to display documentation relevant to the indicated code segment.

FIG. 7A depicts an example implementation of portions of a documentation package 700 written in XML using a custom markup language, which includes tags that correspond to various aspects of a documentation package. In this example, the "codelet" tag 702 provides the top level scope of a documentation package, where the "codelet" tag may encompass two sub elements, a head 704 and a body 706. While actual tag definitions are provided in this example, differently defined tag names may be used while still providing the same functionality described below.

Further, there may be a collection of documentation packages accessible from a code editor, where the code editor may select an appropriate documentation package to load and execute within the code editor environment based on keywords or search terms provided from search interface provided within the code editor, such as interface 804. Each documentation package may correspond to example code for implementing a given code feature. In some embodiments, each time the code editor selects a documentation package for a given sample of code to be inserted within the code editor, there is a unique instantiation of the documentation package within the code editor environment that is tied to the given sample of code. Given that the code editor supports a particular API, documentation packages may be provided by separate third party entities, for example a writer of a library may also provide documentation packages for code features related to the library.

In this example, head 704, encompassed within the "head" tag, may include metadata about the documentation package. For example, an optional "title" tag 708 or optional "description" tag 710 that may include information that may be displayed in search results. Head 704 may also include a "keywords" tag 712 that may be used in searching for a documentation package corresponding to keywords entered in a search interface, such as search interface 804 in FIG. 8. The "type" tag 714 may determine how the code sample or samples corresponding to the documentation package is to be inserted and/or formatted within the code editor. For example, if "type" tag 714 is set to "block", then the one or more code samples are specified to span several lines within the code editor, whereas if the "type" tag 714 is set to "inline", then the one or more code samples, when inserted into the code editor, are inserted as a single line of code or a portion of a single line of code. Other specifications for the "type" tag 714 are possible, such as tag information that may be interpreted to indicate bolded text, or colored text, or a font style or size, among other stylistic or aesthetic specifications that do not affect the functionality of the one or more code samples. The "language" tag 716 determines a default parser may be invoked from the documentation package. In some embodiments, the "language" tag 716 may also be used in filtering search results.

In this example, body 706, encompassed within the "body" tag, may include examples, pages, or links to related documentation packages. In some cases, an example may be a snippet of code, such as the sample code encompassed within the "example" tag 718. In some cases, there may be any number of examples defined within a single "body" tag, however, only one of the examples may be displayed at a time within a code editor for a given documentation package.

An "example" tag may also include any number of "mark" elements, as indicated with a "mark" tag, such as "mark" tag 720. Marks are sections of examples that are tracked and are intended to be changeable. Marks may be nested and may specify values expected to be entered from within a code editor. For example, a mark for a variable within a code sample may specify that it only accepts text characters and digits. In some cases, if more than one mark has the same "id" value, the marks with the same "id" value may have the same value as long as the example code in the documentation package is synchronized with the example code seen within the code editor. In this example, "example" tag 718 includes two marks, a mark for "name" and a mark for "value", and if "name" is "x" and "value" is "1", the example code would correspond to "var x=1;"

In addition to "example" tags, the documentation package may also include any number of "page" 722 tag elements. A "page" tag may include content that is displayed as part of the documentation for the documentation package, such as the content displayed within panel 904 of FIG. 10. In one example, the content within a "page" tag may be written and formatted in accord with HTML, and may be stylized and made interactive with CSS and JavaScript. While in some cases, only one page may be defined to hold the entire content of the documentation, if multiple "page" tags are defined a default visible area occupied in the display of the documentation may be smaller because the visible area may correspond to the page content within the "page" tags. In other words, if two "page" tags are defined with a similar amount of content, then the visible area of the interactive documentation for a documentation package would be sized to display an entire single page, and when a user scrolls to the next page, the next "page" tag is displayed. However, in this example, if a single "page" tag is defined with the same content as the two previous "page" tags, the visible area of the documentation package for the interactive documentation package would be larger, however, a user would not need to scroll to see the remaining documentation because there would be no other pages.

In some embodiments, a documentation package may also include a "link" tag to link to other relevant documentation packages, where a "link" tag may be defined as any one of the following three examples:

<link src="http://www.someexampleURL.com/path/docpkg.html>
<link src="/directorypath/directorypath/docpkg.htmr">
<link src="DocumentationPackageName">

Where the "DocumentationPackageName" may correspond to a "codelet" name tag, such as "codelet" name tag 702 "CreateVar", and where the "directorypath" may be a directory path within a local or network file system.

Further in this example, "script" tag 726 may contain executable code for the documentation package. For example, the "attach_input_to_mark( )" routine call may add an event listener resulting in a correspondence, link, or tie from an element from a "page" tag to an element or elements within an "example" tag. Specifically, as seen within the attach_input_to_mark( )728 call, "val_inp" from "page" tag body 724 is tied or linked to mark id="value" 720. As a result, when an event is detected, such as a change in the value displayed within the documentation content, then the mark id value in the code example is correspondingly changed so that the two elements remain synchronized. Similarly, any number of elements from within the code example inserted into the code may be kept synchronized with elements from the documentation, whether the change originates from within the code example or whether the change originates from within the documentation.

FIG. 7B depicts another implementation of example portions of a documentation package 750 written in HTML and JavaScript™ code, according to one embodiment. However, a documentation package may be implemented in a variety of different programming languages and the features of the example documentation package 750 may be implemented in another programming language.

The example in FIG. 7B depicts, among other sections, a section 752 that includes code for interfacing with a code editor via an API, and a section 754 that includes code for defining the interactive documentation and user interface elements.

Once written, a documentation package may be executable by a code editor to provide each of the functional features described with respect to the execution of a documentation package.

Code Editor Modifications to Support Documentation Packages

Figure 5:
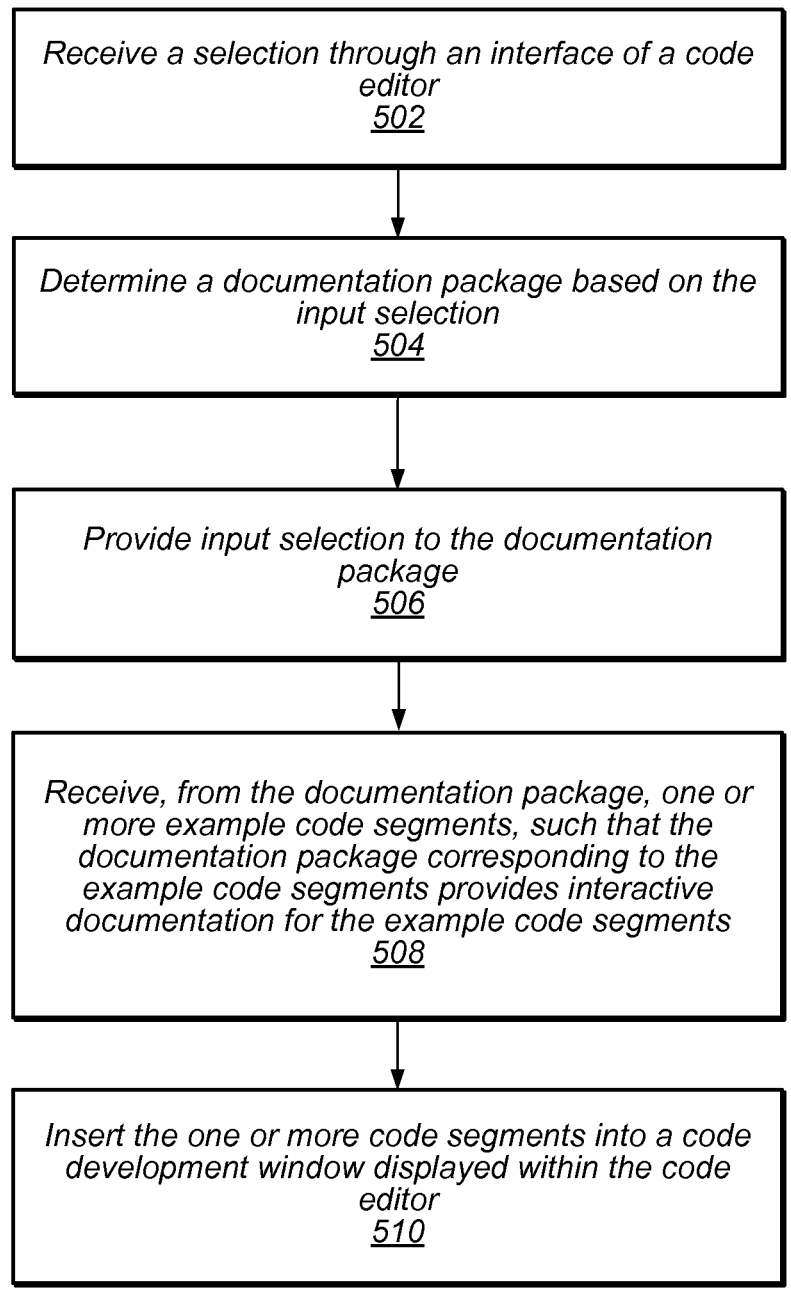
FIG. 5 is a flowchart of an embodiment of a code editor interacting with a user and a documentation package.

FIG. 5 illustrates a flowchart highlighting example processing steps that may be present in an embodiment of a code editor modified to support documentation packages. As noted above, a user may be presented with a variety of methods by which to indicate a selection of a desired software code component, such as example code the user would like to insert into their software code.

FIGS. 8A and 8B illustrate one embodiment according to which a user may initiate the process to include example code segments. In FIG. 8A, a user has manually written some portions of a body of software code. Element 802 of FIG. 8A refers to the current position of a cursor, which indicates where the example code segments are to be inserted into the larger body of software. Element 804 of FIG. 8B illustrates a data entry user interface element. Data entry box 804 may be invoked in several different ways. In some embodiments, a user may select a menu or a user interface element of the code editor indicating invocation of data entry box 804. In other embodiments, the user may right click a mouse and select an option corresponding to invocation of data entry box 804. In other embodiments, a user may use a key or key combination to invoke data entry box 804.

Regardless of the method by which a user enters an indication of a desired software code segment to insert, step 502 of FIG. 5 reflects the receiving of a selection through an interface of the code editor.

Based on the input selection, the code editor may determine the appropriate documentation package to invoke, as reflected by step 504. For example, the code editor may query each supported documentation package to request information in which types of example code segments may be provided. This queried information may be used to select the appropriate documentation package. In some cases, different documentation packages may correspond to different software code segments. In other cases, a single documentation package may correspond to more than one software code segment.

Once the code editor has invoked, or begun the execution of the determined documentation package, the code editor may provide the documentation package with the input selection, as reflected by step 506. At this point, the documentation package may have sufficient information to provide the desired software code segments, or the documentation package may query the code editor for additional information regarding the code under development. In some embodiments, the documentation package may query the user to determine from among several code segments that match the user input, or to interactively guide the user to an appropriate code segment. As discussed above, in some cases, the determination of the example code segment may depend on the context into which the example code segment may be inserted. Further, the context may be analyzed without any compilation of the code base into which the example code segment is to be inserted.

Upon the documentation package determining the example code segment and any additional code needed for proper functioning by the example code segment, the code editor may receive the example code segment for insertion into the code base. At this point, through a persistent association or linkage of the example code segment with a documentation package, the documentation package may provide corresponding documentation for the code segments to be inserted, as reflected in step 508.

Once the code editor inserts the example code into the user's workspace and into the user's software code, as reflected in step 510, the code editor may maintain an association between the documentation package and the inserted example code segment or segments. This association enables the user to interact with the documentation pertaining to the example code segment, and to enable other types of interactions described above and below.

Figure 9:
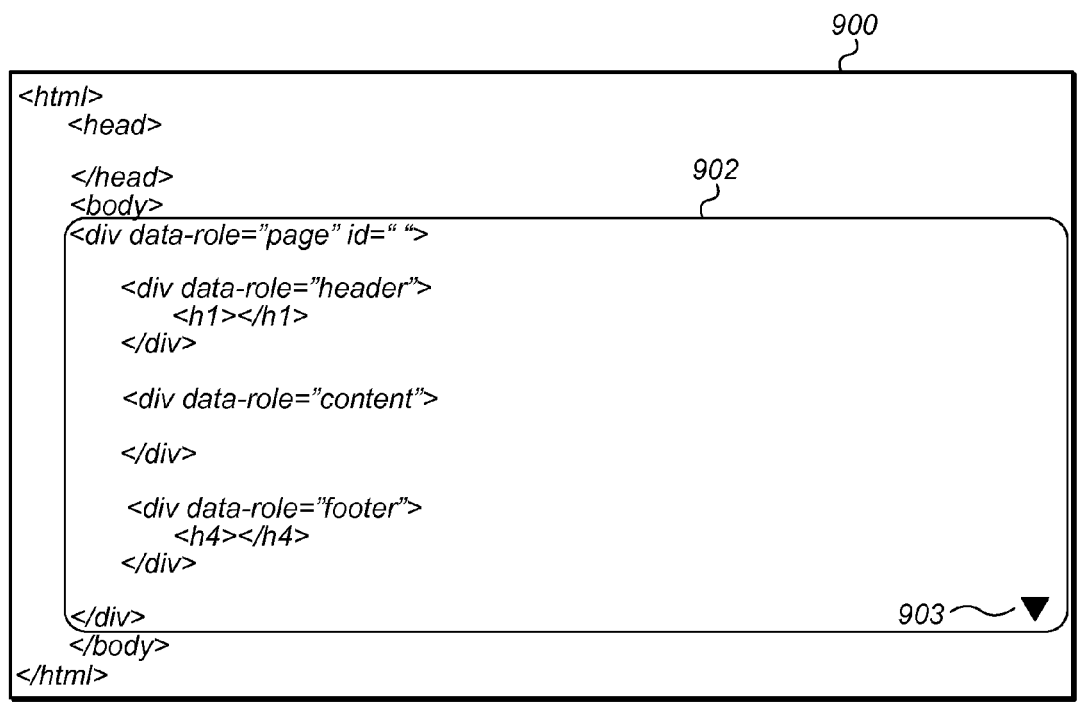
FIG. 9 depicts an illustration of code segments inserted through the execution of a documentation package, according to some embodiments.

In this example, the result of the inserted example code segment can be seen in FIG. 9, depicting code editing region 900. In FIG. 9, the region 902 may be visually demarcated so that the user can see the bounds of the inserted code segments. Visually demarcated region 902 may also be expanded to display the interactive documentation elements, such as those displayed within interactive documentation, or metadata region 904 of FIG. 10. In some embodiments, when the interactive documentation is displayed, the entire display area 900 of the existing code is expanded so that the display of the interactive documentation does not obscure other existing code. In this example, existing code below the visually demarcated region 902 is redrawn, or "pushed", below the visual demarcation boundary. In some embodiments, only the code segments within visually demarcated region 902 are displayed to a user. In this example, a user interface element, not part of the code segments inserted, may be presented corresponding to the visually demarcated region, such that when selected, the interactive documentation is displayed, such as by clicking on arrow 903. Similarly, when the user wants to see only the code segments, the user may click on arrow 903 again to hide the interactive documentation, however, the association is maintained and the user may later display the interactive documentation. In some embodiments, the visual demarcation and arrow 903 are only displayed when a user hovers an input device over example code within region 902.

Figure 10:
FIG. 10 depicts an illustration of a interactive documentation display region, according to some embodiments.

In some embodiments, visual salience of the documentation displayed within interactive documentation region 904 of FIG. 10 may be reduced by indenting the displayed documentation to the same level of indentation of the surrounding code. In this way, the documentation visually blends in with any code segments or blocks to which the documentation is attached. In other embodiments, when the documentation is out of focus, such as in any state other than state 1808 of FIG. 18, the displayed documentation may be faded, grayed out, or invisible.

In some embodiments, when a user has hidden the interactive documentation, such as clicking on a minimize icon within region 904 of FIG. 10, leaving only the display of inserted code segments, the visual demarcation may remain visible to the user while the user is editing within the region of the inserted code segments. If a user moves out of editing within the demarcated region, in some embodiments, the inserted code segment may lose the visually demarcated bounding box, and instead display a dotted underline, such as depicted by element 1102 of FIG. 11. In some embodiments, the dotted underline is only visible when a user hovers a mouse over, or moves a cursor through, the code segments. In other embodiments, the dotted underline may be always visible. In other embodiments, other visual cues may be used instead of a dotted line. Further in this example, if a user clicks on the visual cue, or dotted line, the visually demarcating bounding box may reappear. Once the visually demarcated bounding box reappears, the user may choose to also display the interactive documentation.

Figure 18:
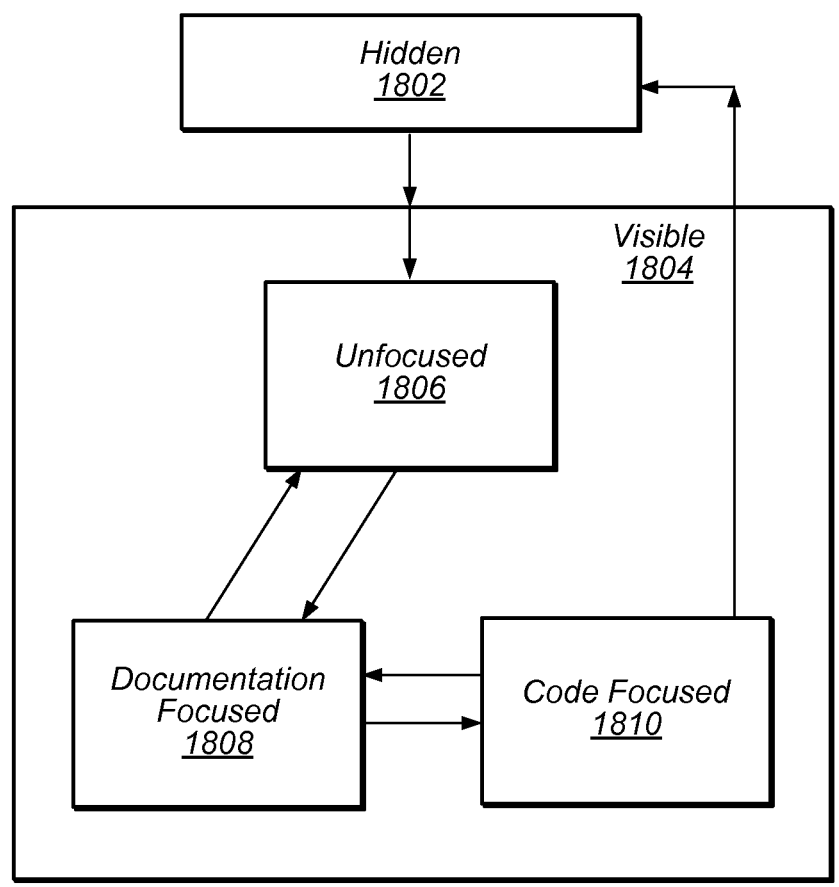
FIG. 18 depicts an illustration of possible states of a documentation package, according to some embodiments.

FIG. 18 illustrates various states of the documentation package as described above, according to some embodiments. For example, in this embodiment, when only the dotted underline 1102 is visible, this state corresponds to hidden state 1802. Further in this example, when a user clicks on the dotted underline 1102 and displays the demarcated region 902, the state moves to unfocused state 1806, which is within visible state 1804. Further in this example, when the user clicks on arrow 903 to display the interactive documentation and/or the builder interface, the state moves from unfocused 1806 to documentation focused state 1808. From documentation focused state 1808, the user may read through documentation, walk through the builder interface, or walk through tutorials. If the user selects a region within the code segment or hides the interactive documentation region 904, the state transitions from documentation focused state 1808 to code focused state 1810. If the user selects a region within the code editor workspace outside the demarcated region 902, the state may transition from code focused state 1810 to hidden state 1802. In this example, the current state may determine what effect actions such as copy and paste may have. For example, in the documentation focused state 1808, a copy action may copy text from the displayed documentation region 904. In this example, in code focused state 1810, a copy action may copy code segment text from code region 902.

Further, in states 1806 and 1808, in this embodiment, if a user performs a copy operation, the entire documentation package, along with the example code segments corresponding to the documentation package are copied. Upon a user pasting in another location, the copied code segments may now correspond to an independent instantiation that is a copy of the original documentation package. In other words, in this embodiment, any changes to either the original or the copy are isolated and do not affect the other documentation package.

FIG. 15 illustrates a continuing example of interactions given the inserted code segments within region 902 of FIG. 10. As described above with respect to FIGS. 8A and 8B, at a given cursor location, a user may instantiate a search box through which example code corresponding to a documentation package may be selected. FIG. 15 illustrates a search box 1502 being instantiated within the context of inserted code statements within region 902. In some embodiments, any number of nested levels of inserted code segments may be supported. In this example, once a selection has been made via interface element 1502, and the documentation package has inserted one or more example code segments, an example result is the code segment 1504, visible within region 902 of FIG. 11. As noted above, inserted example code 1504 corresponds to its own interactive documentation and documentation package, and may be expanded and minimized similar to any other documentation package example code segments.

User interface element 1502, given the user search term "button" may provide the user with two options, a first option "jLibrary Mobile Buttons" that corresponds with a documentation package, and a second option "Internet search 'button'", which may instead perform an Internet search.

Code Segment Previewer

Figure 6:
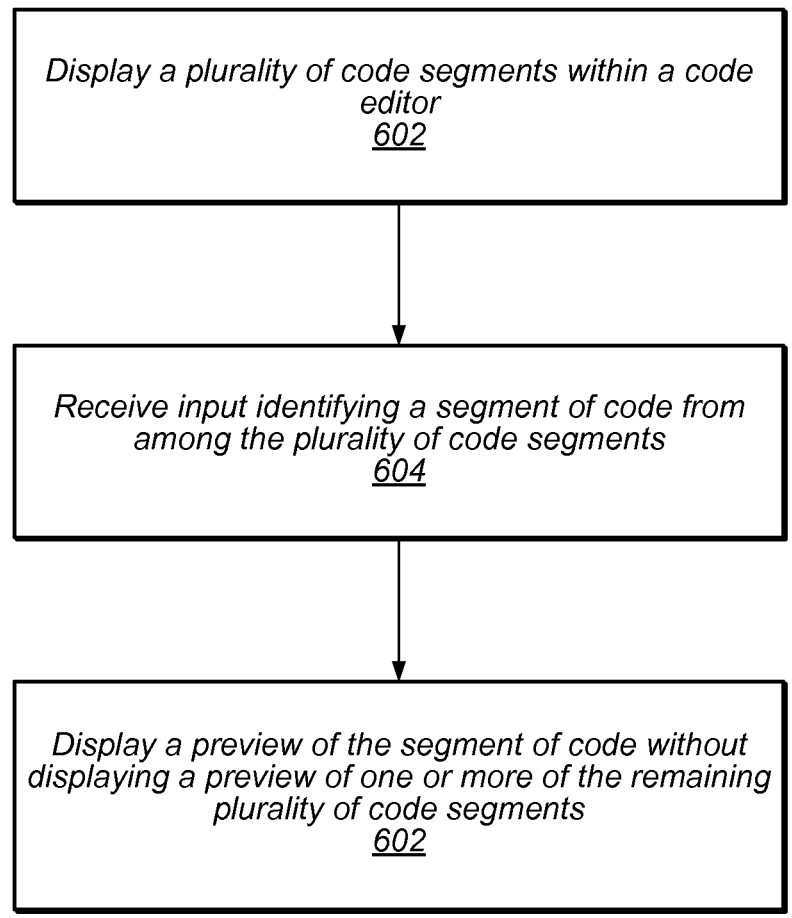
FIG. 6 is a flowchart of an embodiment of a code segment preview tool, according to some embodiments.

FIG. 6 illustrates a flowchart highlighting example processing steps that may be present in an embodiment of a code segment previewer. A code segment may be a single line or element of code, a contiguous number of lines of code, or a collection of scattered segments of code that are not contiguous. As noted above, the code segment previewer functionality may be incorporated within a documentation package or within a code editor. In each case, the code segment previewer may generate a preview without a compilation of the larger code base from which the code segment was drawn.

Support for the code segment previewer within the code editor may be, in some embodiments, native or through use of plugin functionality. In other embodiments, the code segment previewer may be implemented on a remote system or within a cloud computing environment. In the case where the code segment previewer is implemented remotely, a code editor would provide the code segment to the code segment previewer, and the code segment previewer would return a preview to the code editor. The returned preview may be in the form of rendered graphical information or in the form of a body of preview code to be interpreted by the code editor in order to generate the preview to display. In other embodiments, the code editor may provide the entire code base to the code segment previewer and also provide information used to identify the segment or segments within the larger code base that are to be previewed. In some embodiments, communication between a code editor and a remote system implementing a code segment previewer may be performed through an application programming interface.

In this example, a code segment previewer is implemented by a code editor. As depicted within step 602 of FIG. 6, this example begins with a display of a plurality of code segments within the code editor. Given the display of the plurality of code segments, a user may specify a selection of one or more segments of code from among the plurality of code segments.

As depicted within step 604, the code segment previewer receives the input identifying one or more segments of code displayed within the code editor, where the one or more segments of software code to be previewed are from among and part of the plurality of code segments making up the entire code base. In other words, in this example, the code to be previewed is a strict subset of the entire body of software code.

In response to the input identifying the one or more segments of code from among the plurality of code segments, the code segment previewer may display a preview of the segment of code, as reflected in step 606.

In the embodiment where the code segment previewer is implemented on a remote system, instead of displaying the code segment preview, the code segment previewer may generate preview code. Further, the generated preview code, when interpreted by the code editor, generates a preview of the one or more segments of code.

As noted above, the preview visible to the user may be performed in different ways. In some embodiments, the preview is displayed by the code segment previewer such that the user may interact with the displayed preview. For example, if the preview code includes user interface elements such as buttons or scroll bars or input fields or checkboxes, the user may manipulate each user interface element to see the result of clicking a button, scrolling, entering data, or checking boxes. In other words, the preview may be interactive and input received via the preview display is processed by the code segment previewer based at least on the corresponding one or more code segments from which the preview is generated. In some cases, to generate the preview, the code segment previewer may introduce additional code segments, either from the larger code base from which the code segments to be previewed were drawn, or from code segments provided or generated. For example, some elements of the code to be previewed may depend upon a type or definition within an include file or another part of the code base.

Figure 19:
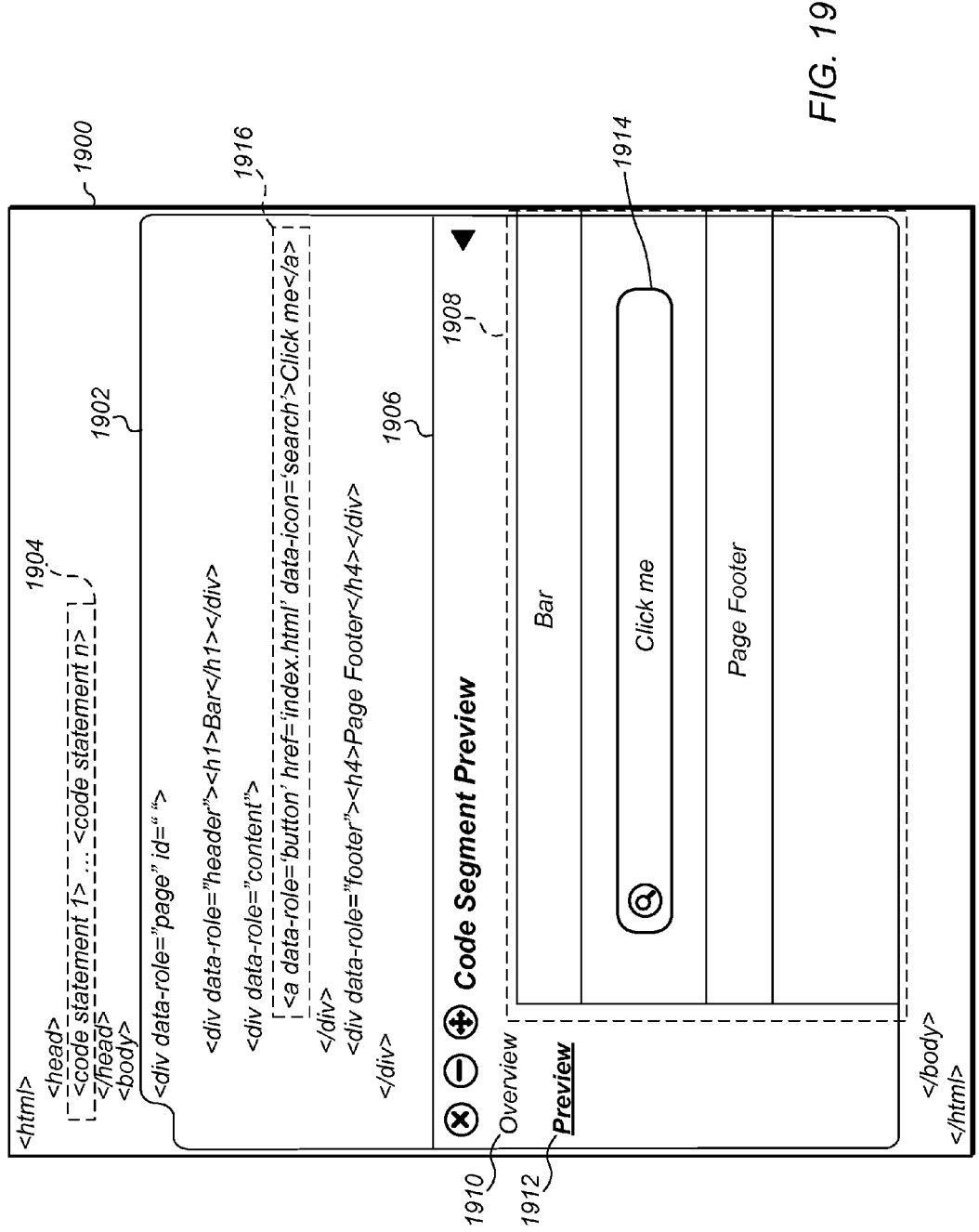
FIG. 19 depicts an illustration of a code segment preview, according to some embodiments.

In some embodiments, when the code segment previewer is incorporated into a documentation package, the preview of the code segment may be displayed within a visually demarcated region corresponding to an example code segment corresponding to the documentation package. In this case, the visually demarcated region is depicted by element 1902 of FIG. 19, and the larger context of the code base is depicted by element 1900. In this example, the preview is displayed within region 1908. Further in this example, visually demarcated region 1902 corresponds to the segments of code to be previewed and also corresponds to code segments inserted by the documentation package. Region 1906 corresponds to the area within which the documentation package that in addition to displaying a preview of a segment of code, may also display documentation, or user interface elements related to the code segments.

In this example, if a user selects Preview 1912, the preview of the code segments corresponding to the documentation package are previewed within region 1908. As depicted within the preview, each user interface element and designation corresponds to the code segments within region 1902. In this example, the code segments are only part of the larger code base, which includes code statements 1 through code statements n, as depicted by element 1904.

In this example, if a user clicks on Overview 1910, region 1908 may then display the interactive documentation or user interface elements that correspond to the one or more example code segments inserted by the documentation package. If there are multiple code segments corresponding to the documentation, the interactive documentation region may, in addition to the initial overview documentation, provide a user with specific documentation related to specific code segment elements as a user selects different elements of the code segments displayed.

In other embodiments, interactions with the preview are live, in the sense that the underlying code is executing and responsive to user inputs. Further, in some embodiments, corresponding code segments within region 1902 may be highlighted as a user interacts with portions of the displayed preview. For example, if a user clicks on preview element 1914, "Click me", then in response, the documentation package may highlight corresponding code segment 1916. Further, in some embodiments, the preview is live or interactive in the sense that as a user enters changes to the code segment, the preview displayed may be updated in response, such that the preview is synchronized with the updated code segment.

In other embodiments, a user may select any one or more segments of code to be previewed, whether or not the selected code segments correspond to a documentation package. However, codes segments within a documentation package are efficiently previewed in the sense that each of the code segments corresponding to the documentation package are cohesive. In other words, a cohesive segment of code is a segment of code where each element of the segment of code is related. In cases where a user selects a group of code segments including one or more code segments that depend on other code segments not selected in order to be functional, those code segments may be excluded from the generated segment preview. In other embodiments, the code segment previewer, upon determining that a selected code segment depends on other unselected code segments, may query the code editor to determine a minimal set of code segments that were not selected, and on which dependencies may be determined to exist, in order to include those unselected segments with the selected segments. With the code segment previewer automatically including additional code segments, the one or more selected code segments that were not cohesive may become cohesive. This situation may occur if a user is unaware of all of the segments of code that may be necessary in order to generate a preview of a selected code segment.

With respect to nested documentation package code segments, in some embodiments, a preview operation may apply to the current level of code and all nested levels of documentation package code segments. In other words, in this example, code segment 1916 may correspond to its own documentation package, however, code segment 1916 is within the scope of code segment 1902, and therefore the preview includes a preview of code segment 1916. In this example, if the documentation package corresponding to code segment 1916 were activated, a user may select the preview option within that documentation packages user interface, and in this case, a preview would apply only to code segment 1916. In this example, the user would see only a display of the button corresponding to button code 1916, and not the other user interface elements corresponding to the remaining code of documentation package code region 1902.

Context Awareness and Analysis

As discussed above, a documentation package may communicate with a code editor via an API. In addition to a documentation package providing example code tied to interactive documentation, the documentation package may query the code editor for information regarding the context into which the example code provided by the documentation package is to be inserted. Given contextual information, the documentation package may perform a context analysis to determine and provide additional code segments or information useful to a code developer. The context analysis may be performed without any compilation of the existing code or example code to be inserted.

In some embodiments, a segment of code inserted by and corresponding to a documentation package may have been selected from among multiple relevant code example segments based on the context within the body of the software under development into which the segment of code is inserted. This context awareness, or context dependency is based on information that may be requested by the documentation package from the code editor via a documentation package API. In other words, selecting appropriate code given the context of where the code is to be inserted is one advantage of using contextual information.

In other cases, example code segments within a documentation package may not be syntactically valid within the software code context into which the example code segments may be inserted. In other words, while the example code segment provided by the documentation package may itself be syntactically valid, the target location within the body of code into which the example code segment is to be inserted may result in the example code segment becoming not syntactically valid. For example, if a user attempts to insert a button into a region of code that does not support buttons, the user may be warned by the documentation package of the reason for potential incompatibilities.

In other cases, while the example code segments may remain syntactically valid when inserted into a user's code, the example code segments, based on the insertion point context, may not conform to one or more coding conventions. In such case, the documentation package may provide a warning to the user regarding the lack of conformance to coding conventions regarding the example code segment inserted. For example, the example code may require the inclusion of one or more library files in order to produce results in conformance with coding conventions. In such a case, the documentation package may query the code editor for contextual information to determine whether or not the library files recommended for inclusion within the code have been included. If the library files have not been included, the user may be provided a warning from the documentation package instructing that the library files are recommended to be included. Further, the documentation package may also present the user an option to automatically insert additional code segments to include the missing library files. In some embodiments, this warning, and other warnings, do not rely on static analysis, type systems, or library code contracts.

In other embodiments, the documentation package may use contextual information to customize example code provided. For example, if a user has already written some code elements related to the example code, the documentation package may customize the example code segment to not include those code elements. In another example, a user may have yet to code elements related to the example code, in which case, the documentation package may customize the base code segment example to include the code elements. In other cases, standard practices may indicate that selected example code is often used in conjunction with other segments of code, and in such a case, the documentation package informs the user of the standard practice and may offer the additional code examples.

Once an example code segment has been provided by a documentation package and has been inserted into a body of code, the code editor maintains a correspondence between the example code segment and the documentation package. In other words, the documentation package remains tied or linked to the example code. In some embodiments, a user may remove any associations between the example code and the related documentation package.

Given that an inserted example code segment maintains a correspondence to a documentation package, a user may continue to access interactions provided by the documentation package with respect to the example code segment.

In some embodiments, if the context of a user's code base changes at a point after an example code segment has been inserted, the documentation package may reassess the context and determine if any changes should be recommended to the user based on the new context. In some embodiments, the documentation package may periodically or aperiodically query the code editor to determine whether any context changes relevant to the example code segment have occurred. In other embodiments, either periodically, aperiodically, or whenever a context change occurs, the code editor may provide every documentation package within the scope of the code base with an alert regarding a change. Given an alert or a determination of a context change, the documentation package may go through the steps described above with respect to determining an initial example code segment given the context at the time. Based on a reevaluation of the current context, the documentation package may determine one or more modifications to the current code segment, and/or one or more additional code segments, and/or identify one or more code segments from the current code segment for removal or addition. In some cases, prior to any modifications to the current example code, the documentation package may provide a warning for the user regarding the change and the basis for the change. In other cases, the documentation package may request approval of any changes before any changes are applied.

In some embodiments, a user may make changes to the inserted example code segment provided by a documentation manager, and the documentation manager may, in response, update documentation or explanatory text corresponding to the example code. For example, an example code segment may include a variable name, and the documentation related to the variable within the documentation package may reflect the variable name within the context of the explanatory text. The connection between the explanatory text within the documentation package and the example code segment within the user's code base is maintained when a user makes changes to the code. In other words, when the user changes the variable name, the documentation package, in response, updates the explanatory text to reflect the new variable name. Thus, at any point that the user references the documentation, or explanatory text corresponding to the example code segment, the documentation, or explanatory text may reflect the current status of the example code segment. In other embodiments, every other operation involving the changed variable is also updated.

Interactivity

The documentation related to an example code segment maintained by a documentation package may be referred to as metadata, data about the example code segment. The content of the metadata may include explanations regarding how the example code works. The metadata may also be used in constructing a user interface with interactive elements tied to the current example code segment, such that the user interface elements are consistent with and/or synchronized with the example code segment. As noted above, in some embodiments, the metadata is not static, but rather dynamic.

The metadata may correspond to user interface elements, where manipulation of the user interface elements directly results in changes to the corresponding code segment.

FIG. 15 illustrates example code segments within region 902 inserted into a code base and corresponding to a documentation package. Region 904 corresponds to documentation, or metadata for the code segments within region 902. The documentation provides a textual overview covering the code segments. Depicted by window 1502, a user may nest additional documentation packages within existing documentation packages. As depicted within window 1502, a user is attempting to insert additional example code related to a button. Given a user selection within window 1502 of a software code component (a button), that corresponds to a documentation package, the documentation package may be invoked by the code editor to insert code segments for defining a button.

Figure 16:
FIG. 16 depicts an illustration of roundtripping within a documentation package, according to some embodiments.
Figure 17:
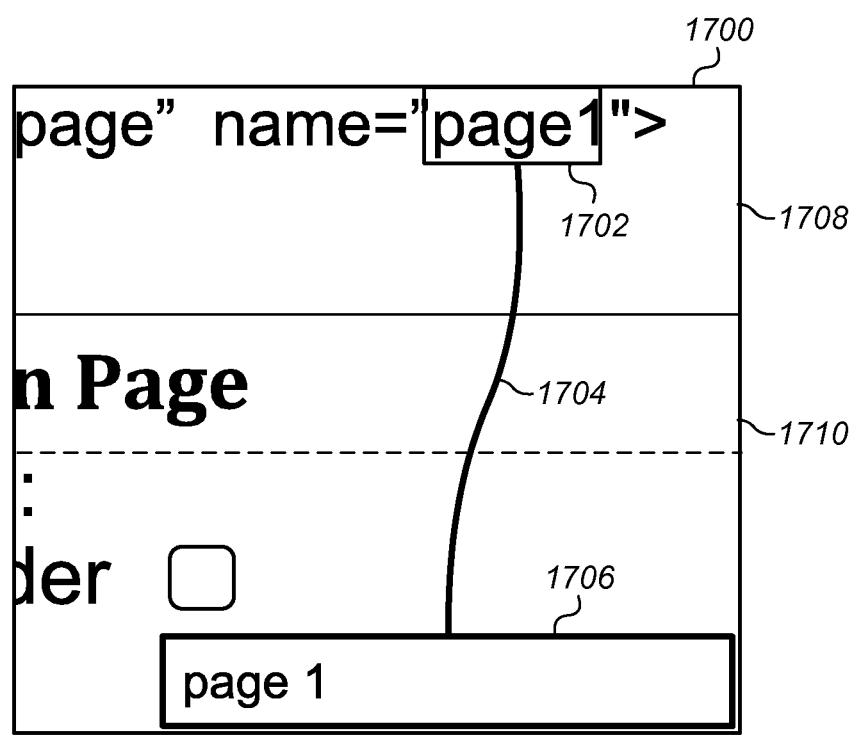
FIG. 17 depicts an illustration of highlighting a connection between elements of a code segment and elements of interactive documentation, according to some embodiments.

FIG. 16 illustrates the result of the user selecting a documentation package to insert code segments for defining a button, in response to the user selecting a software code component within window 1502 corresponding to the documentation package. In this case, the example code segments within region 1600 are inserted into region 902 of FIG. 15 in response to the user input via window 1502.

Once inserted, the example code segment defining a button is "<a data-role='button' href='' data-icon='plus' data-iconpos='top'>push me</a>" and a user interface corresponding to each element of the code segment is illustrated within region 1600. In this example, the "data-icon='plus'" element of the button definition corresponds to user interface element 1602. If a user were to click on user interface element 1604, the corresponding code segment would, in response, change to "data-icon='search'", for example. In this case, the user interface element 1602 may be displayed as selected and visually highlighted in some way, such as darkening the button, or otherwise highlighting the plus button. Similarly, if a user were to instead modify the code segment element and change "data-icon='plus'" to "data-icon='search'", then the user interface element would, in response, update the user interface element to highlight icon 1604. This is an example of roundtripping.

In some embodiments, sections of code that may change may be associated with marks, such that a mark can specify the type of input expected. For example, a mark for a variable may specify that it may only accept characters and digits. In this embodiment, when a mark value changes, for example through a user edit or a move of the code segment to another location, an event listener may notify the documentation package to update the corresponding interactive documentation elements. In some embodiments using marks, if a user enters a value within a code segment, the documentation package may determine that the value is invalid in syntactically inconsistent with the code segment, and provide a warning to the user. In such a case, the corresponding documentation is not updated. In some embodiments, in case of a mismatch between the code segment and the interactive documentation, the documentation text may be flagged or otherwise flagged as inconsistent. In some embodiments, a mark may be a variable kept by the documentation package. In some embodiments, if the documentation becomes out of sync with the code segment, then the documentation package prevents any further modifications to the code via the interactive documentation.

In some embodiments, the documentation package may periodically or aperiodically query the code editor to determine if any changes to the user's code base have an effect on the code segments corresponding to the documentation package. This functionality may be implemented with a listening function. In other cases, the documentation package may provide an event handler to receive notification from the code editor when changes are made to the user's code. In some embodiments, the code editor may notify the documentation package if a change is made within code whose scope encompasses the code segments of the documentation package. In other embodiments, the code editor notifies the documentation package of any code changes.

Another example of the tie between the code segment and the interactive documentation is the tie between code element 1606 and user interface element 1608. In this case, if a user updates the text within the code segment depicted by element 1606, then, in response, user interface element 1608 may be updated with the updated text. A similar update to the text within the code segment is performed in case the user updates the text within text box 1608.

In some cases, there may be sufficient elements to the code segment such that it may not be immediately clear to a user which code elements correspond with which user interface elements. Thus, in some embodiments, the documentation package may display a connecting line between an element in the code segment that corresponds with an element within the corresponding user interface, as illustrated by screen region 1700. Screen region 1708 corresponds to the displayed code segments, and screen region 1710 corresponds to corresponding metadata, and/or documentation, and/or interactive user interface elements. Element 1702 depicts a value within the code segment, element 1706 depicts the corresponding user interface element, and line 1704 is drawn on the screen to highlight the correspondence between elements 1702 and 1706.

In other embodiments, instead of drawing a visible line to display a correspondence between elements, the documentation package may simultaneously highlight corresponding elements. For example, a user may hover over an element within the user interface or the code segment, and right click to select an option to highlight the corresponding element. In other embodiments, a user may select an option displayed within the metadata region 1710 to indicate that correspondences be displayed between elements of the code segment and the user interface elements. Similarly, if textual documentation is displayed, when a user indicates to highlight associations between code segment elements, portions of the textual documentation may be displayed as connected, either through a visible line, or through color coding, or through simultaneous highlighting. In some embodiments, a user may elect to see one visible line association at a time, and click an option to display a next association, and in this way, cycle through each code segment element. In other embodiments, a user may elect to see every association line at one time. In such a case, each line may be color coded, or otherwise visually distinguished.

In other embodiments, the documentation package may walk a user through the various options for defining an inserted code segment. For example, initially, the documentation package may insert a code segment with default settings, as depicted by code segment region 1600 of FIG. 16. In this initial state, the corresponding user interface within metadata region, or user interface region 1600, may display some corresponding explanatory text in addition to providing a builder interface, or the user interface elements through which a user may define the code segment elements.

In the initial state when a code segment is first inserted, a user may be presented with the builder interface within window region 1600. As a first step of a walk through definition of the code segment elements, the builder interface may visually highlight element 1612 as the first code segment element to define. In addition to highlighting element 1612, the documentation package may provide explanatory text to explain the options available for setting element 1612, such as an overview of the different types of buttons and what they tend to be used for.

Given a user selection of a button type corresponding to element 1612, the documentation package may then highlight another aspect of the builder interface, such as element 1614 for defining the placement of a button. Correspondingly, the documentation package may also change the explanatory text displayed to be relevant to the currently highlighted builder interface element. Similarly, the user may be walked through builder interface elements 1616 and 1618 to complete the definition of the code segment inserted. Further, as each builder interface element is defined, the corresponding code segment element definition is synchronized and updated in response.

In addition, in some embodiments, at the initial state of a user first inserting a code segment, a user may be provided the option to display a short video sequence, or animated series of actions of an example definition of the code segment elements.

Interactivity and Linked Documentation

Figure 12:
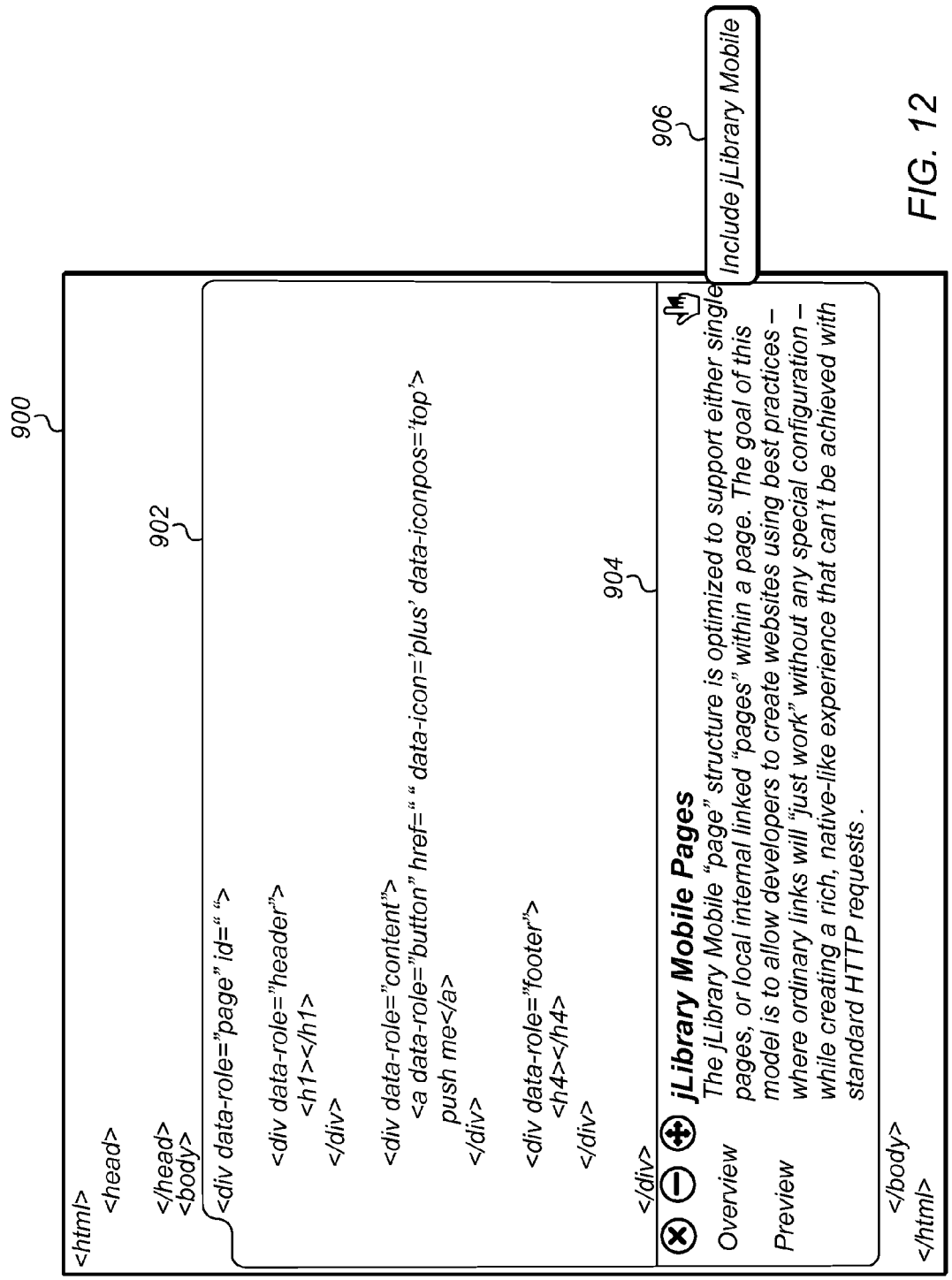
FIG. 12 depicts an illustration of linked documentation within an interactive documentation region, according to some embodiments.

FIG. 12 illustrates other types of interactions supported by documentation packages. As described above, visually demarcated bounding box 902 includes example code statements inserted into a code base and which correspond to a documentation package. Also described above, a user may elect to display interactive documentation region 904. In some cases, the inserted example code may be syntactically correct, however, it may not perform as the user expects without additional code statements. In such a case, in some embodiments, documentation package may display explanatory text regarding the inserted code statements within region 904 of FIG. 12, and at the same time, the explanatory text may inform the user that a certain library file should be included. The user may be visually alerted to this recommendation through the display of floating information 906, including a synopsis of the recommended action.

In some embodiments, a user may simply click within the floating information box 906, and in response, the documentation package may automatically insert the appropriate code segment within the body of code. In this case, the documentation package may query the code editor to obtain contextual information in order to determine where within the code the new code segments may validly be inserted. In some embodiments, the newly inserted code may remain tied to the original documentation package, and in other embodiments, the newly inserted code region may correspond to a new and independent documentation package.

In other embodiments, a user may click and drag floating information box 906 and drop floating information box 906 at a point within the body of code where the user would prefer to insert the new code segment. In some embodiments, the floating information box 906 may provide visual indications regarding appropriate locations of where the new code segments may be inserted. For example, the floating information box 906 may be highlighted or colored green to indicate appropriate, or syntactically valid, locations for the placement of the new code segments. In this example, if the user drags floating information box 906 over a region of code that is not appropriate, or would result in syntactically invalid code segment, the floating information box 906 may be unhighlighted or colored red. This interactive feedback regarding current syntactic validity may be enabled by the documentation package querying the code editor for context information in response to the user dragging and moving the floating information box 906 across a display.

Figure 13:
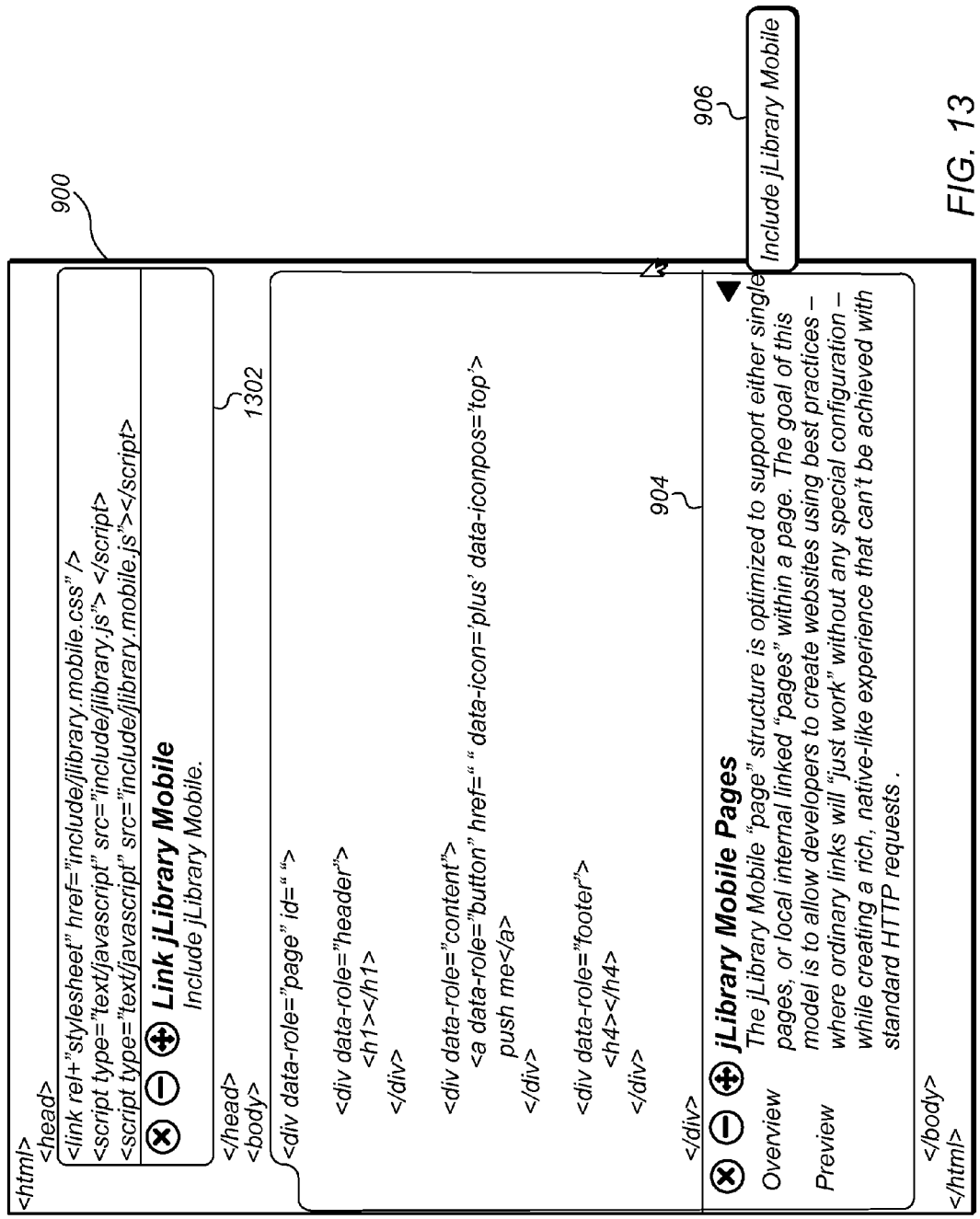
FIG. 13 depicts an illustration of user inserting linked documentation, according to some embodiments.

In either described case above, either auto insertion or manual insertion of the new code segment, an example result is depicted by element 1302 of FIG. 13. As noted above, the newly inserted code segments within 1302 may remain tied to the original documentation package or the newly inserted code segments within 1302 may correspond to a new instantiation of a documentation package.

FIG. 14 illustrates example interactions related to the display and manipulation of the documentation package code segments. Within interactive documentation region 1304, in some embodiments, a user may be provided three icons, icon 1402, icon 1404, and icon 1406.

In some embodiments, icon 1402, when selected, may permanently delete any ties to a documentation package. In other words, after selecting icon 1402, the code segment inserted by a documentation package becomes like any code directly written by the user.

In some embodiments, a user may select a given section of code, that may or may not have previously been inserted by a documentation package, and given the selected code, initiate a search to tie the selected text to a documentation package. Once a documentation package is tied to the existing, selected code, the interactive documentation and metadata for the documentation package may be updated to be synchronized with the current values and setting of the existing code segments. At this point, all other interactions described for documentation packages become available. In other embodiments, a user may simply select a region of code, and if the region encompasses a segment of code inserted by and tied to a documentation package, the documentation package correspondence is deleted along with the rest of the region of code.

In some embodiments, icon 1404, when selected, may minimize the interactive documentation region 1304. In this case, the result would be display of the bounding box around code 1302, since the documentation package is still active. At this point the result would be similar to the display of region 902 of FIG. 9, which only displays the code segments without any interactive documentation or builder interface information. To undo the selection of the minimize icon 1404, a user may click on a user interface element such as icon 903 of FIG. 9.

In some embodiments, icon 1406, when selected, enables a user to drag the code segments tied to the documentation package to another point within the user's code base. Each of the code statements tied to the documentation package may therefore be moved all at once. In other embodiments, a user may click and hold while the cursor is over one of the code segments tied to the documentation package, and may thus similarly move the entire block of code corresponding to the documentation package. As described above with regard to the movement of floating information box 906, as a user moves a code segment, the documentation package may provide current feedback regarding the appropriateness of the code segment for the current location in which the code segment finds itself during a drag operation.

Example Computer System

Figure 20:
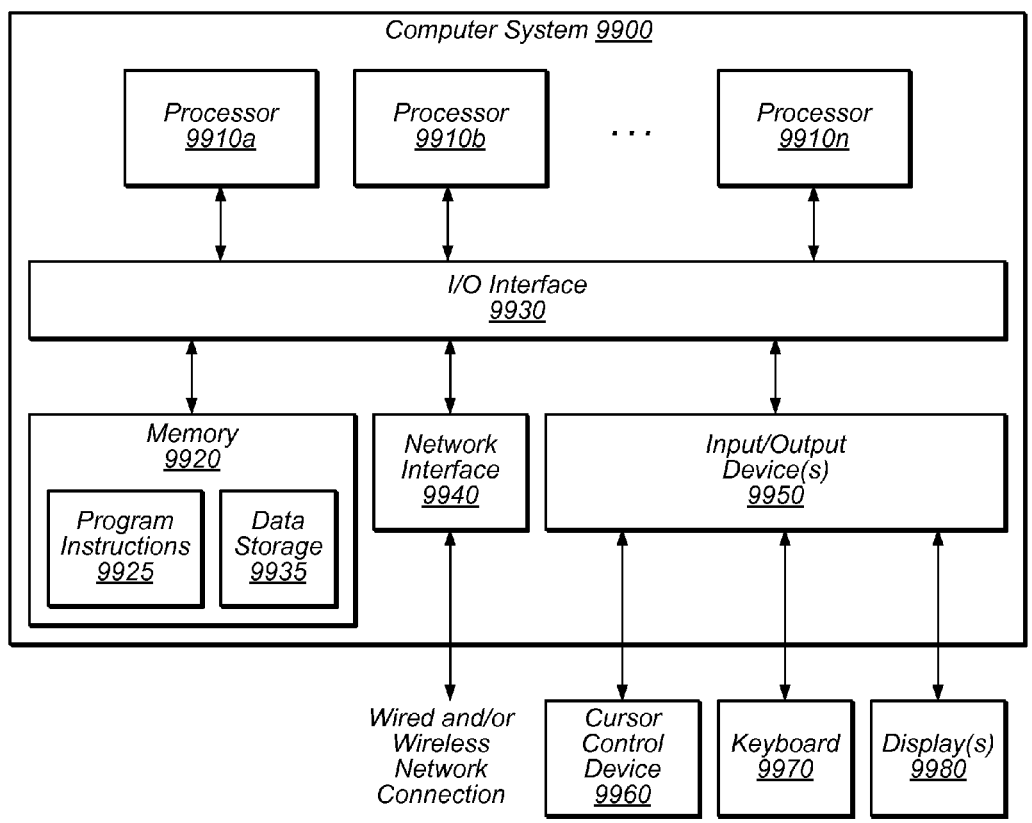
FIG. 20 depicts elements of an example computer system capable of implementing a code editor modified to support interactive documentation and code segment insertion, document packages, and a code segment previewer.

FIG. 20 illustrates a computer system 9900 that may execute embodiments of the keyword refinement tool. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors 9910a-9910n coupled to system memory 9920 via input/output (I/O) interface 9930. The computer system further includes network interface 9940 coupled to I/O interface 9930, and one or more input/output devices 9950, such as cursor control device 9960, keyboard 9970, and one or more displays 9980. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the content object processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory within the computer system may be configured to store program instructions and/or data accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the keyword refinement tool are shown stored within system memory 9920 as program instructions 9925 and data storage 9935, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of the keyword refinement tool as described herein. In one embodiment, the program instructions may include software elements of embodiments of the modules discussed earlier in one of the embodiments of the keyword refinement tool. The data storage within the computer system may include data that may be used in other embodiments. In these other embodiments, other or different software elements and data may be included.

Those skilled in the art will appreciate that the computer system is merely illustrative and is not intended to limit the scope of the keyword refinement tool as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a non-transitory computer-readable storage medium. Generally, a computer-accessible or computer-readable medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   performing, by one or more computing devices:
   receiving, through an interface of a code editor, an input selecting a code feature for a location within code displayed within an editing window of the code editor;
   obtaining, through an application programming interface to a documentation package for the selected code feature, at least one code sample for the selected code feature and corresponding documentation for the selected code feature from the documentation package, the corresponding documentation containing explanatory information for the selected code feature;

inserting, at the location within the code displayed within the editing window of the code editor, the at least one code sample into the editing window, the at least one code sample persistently associated with the documentation package for displaying the corresponding documentation within context of the at least one code sample in the code editor;

receiving, through the interface of the code editor, an input indicating a change to a code element of the at least one code sample; and synchronizing, within the documentation package, at least one reference corresponding to the code element by modifying the at least one reference within the documentation package to be consistent with the change to the code element.

2. The method of claim 1, further comprising:

receiving, through an interface of the documentation package, a modification for the code feature; and sending the modification through the application programming interface between the code editor and the documentation package, wherein the code editor, in response to receiving the modification, modifies the at least one code sample in accord with the modification.

3. The method of claim 1, further comprising:

maintaining a correspondence between the at least one code sample and a support tool throughout a move of the at least one code sample from the location in the editing window to another location in the editing window or to another editing window within the code editor, wherein the documentation package implements the support tool; and maintaining the correspondence between the at least one code sample and the documentation package following a closing and reopening of the code editor.

4. The method of claim 1, further comprising the documentation package:

displaying a visually demarcated region proximate to the at least one code sample; and displaying, within the visually demarcated region, the documentation corresponding to the at least one code sample.

5. The method of claim 1, further comprising the documentation package:

displaying a visually demarcated region proximate to the at least one code sample; and invoking a support tool such that an interface for the support tool is within the visually demarcated region within the context of the at least one code sample, wherein the documentation package implements the support tool.

6. The method of claim 1, further comprising a code feature:

being any programming language call, definition, or statement serving as a basis for implementing a particular aspect of an executable software program.

7. A system, comprising:

at least one processor; and a memory comprising program instructions, wherein the program instructions are executable by the at least one processor to:

receive, through a user interface of a code editor, an input selecting a code feature for a location within code displayed within an editing window of the code editor;

obtain, through an application programming interface to a documentation package for the selected code feature, at least one code sample for the selected code feature and corresponding documentation for the selected code feature from the documentation package, the corresponding documentation containing explanatory information for the selected code feature;

insert, at the location within the code displayed within the editing window of the code editor, the at least one code sample into the editing window, the at least one code sample persistently associated with the documentation package for displaying the corresponding documentation within context of the at least one code sample in the code editor;

receive, through the user interface of the code editor, an input indicating a change to a code element of the at least one code sample; and synchronize, within the documentation package, at least one reference corresponding to the code element by modifying the at least one reference within the documentation package to be consistent with the change to the code element.

8. The system of claim 7, wherein the program instructions are further executable by the at least one processor to:

send, from the code editor through the interface, the input selection to a documentation package, wherein the interface is an application programming interface.

9. The system of claim 7, wherein the program instructions are further executable by the at least one processor to:

display a visually demarcated region proximate to the at least one code sample; and invoke a support tool such that an interface for the support tool is within the visually demarcated region within the context of the at least one code sample, wherein the documentation package implements the support tool; and in response to a selection of a user interface element of the interface for the support tool, toggle said display of the interface for the support tool within the visually demarcated region.

10. The system of claim 7, wherein the program instructions are further executable by the at least one processor to:

maintain a correspondence between the at least one code sample and a support tool throughout a move of the at least one code sample from the location in the editing window to another location in the editing window or to another editing window within the code editor, wherein the documentation package implements the support tool; and maintain the correspondence between the at least one code sample and the documentation package following a closing and reopening of the code editor.

11. A non-transitory computer-readable storage medium storing program instructions that when executed by a computing device cause the computing device to perform:

receiving, through a user interface of a code editor, an input selecting a code feature for a location within code displayed within an editing window of the code editor;

obtaining, through an application programming interface to a documentation package, at least one code sample for the selected code feature and corresponding documentation for the selected code feature from the documentation package, the corresponding documentation containing explanatory information for the selected code feature;

inserting, at the location within the code displayed within the editing window of the code editor, the at least one code sample into the editing window, the at least one code sample persistently associated with the documentation package for displaying the corresponding documentation within context of the at least one code sample in the code editor;

receiving, through the user interface of the code editor, an input indicating a change to a code element of the at least one code sample; and synchronizing, within the documentation package, at least one reference corresponding to the code element by modifying the at least one reference within the documentation package to be consistent with the change to the code element.

12. The non-transitory computer-readable storage medium of claim 11, wherein the non-transitory computer-readable storage medium further stores program instructions that when executed by the computing device cause the computing device to perform:

the documentation package displaying a visually demarcated region proximate to the at least one code sample; and the documentation package displaying, within the visually demarcated region, the corresponding documentation for the at least one code sample.

13. A method, comprising:

performing, by one or more computing devices:

receiving, through an interface of a code editor, an input selecting a code feature for a location within code displayed within an editing window of the code editor;

selecting, by the code editor, a documentation package that corresponds to the selected code feature;

determining, through an application programming interface for the corresponding documentation package, at least one code sample for the selected code feature; and inserting, by the code editor at the location within the code displayed within the editing window of the code editor, the at least one code sample into the editing window, the at least one code sample persistently associated with the corresponding documentation package.

14. The method of claim 13, further comprising:

querying, through the application programming interface for the corresponding documentation package, the code editor for additional information regarding code under development.

15. The method of claim 13, further comprising:

displaying, through the application programming interface for the corresponding documentation package, a visually demarcated region proximate to the at least one code sample;

invoking, through the application programming interface for the corresponding documentation package, an interactive query tool such that an interface for the interactive query tool is within the visually demarcated region within the context of the at least one code sample, the corresponding documentation package implementing the interactive query tool; and in response to a selection of a user interface element of the interface for the interactive query tool, determining, through the application programming interface for the corresponding documentation package, at least one code sample for the selected code feature.

16. The method of claim 13, further comprising:

receiving, through the application programming interface for the corresponding documentation package, an input indicating a change to a code element of the at least one code sample; and synchronizing, through the application programming interface for the corresponding documentation package, at least one reference corresponding to the code element within the corresponding documentation package, wherein said synchronizing comprises modifying the at least one reference within the corresponding documentation package to be consistent with the change to the code element.

17. A system, comprising:

at least one processor; and a memory comprising program instructions, wherein the program instructions are executable by the at least one processor to:

receive, through a user interface of a code editor, an input selecting a code feature for a location within code displayed within an editing window of the code editor;

select, by the code editor, a documentation package that corresponds to the selected code feature;

determine, through an application programming interface for the corresponding documentation package, at least one code sample for the selected code feature; and insert, by the code editor at the location within the code displayed within the editing window of the code editor, the at least one code sample into the editing window, the at least one code sample persistently associated with the corresponding documentation package.

18. The system of claim 17, wherein the program instructions are further executable by the at least one processor to:

query, through the application programming interface for the corresponding documentation package, the code editor for additional information regarding the code under development.

19. The system of claim 17, wherein the program instructions are further executable by the at least one processor to:

display, through the application programming interface for the corresponding documentation package, a visually demarcated region proximate to the at least one code sample; and invoke, through the application programming interface for the corresponding documentation package, an interactive query tool such that an interface for the query tool is within the visually demarcated region within the context of the at least one code sample, the corresponding documentation package implementing the interactive query tool; and in response to a selection of a user interface element of the interface for the interactive query tool, determine, through the application programming interface for the corresponding documentation package, at least one code sample for the selected code feature.

20. The system of claim 17, wherein the program instructions are further executable by the at least one processor to:

receive, through the application programming interface for the corresponding documentation package, an input indicating a change to a code element of the at least one code sample; and synchronize, through the application programming interface for the corresponding documentation package, at least one reference corresponding to the code element within the corresponding documentation package, wherein said synchronizing comprises modifying the at least one reference within the corresponding documentation package to be consistent with the change to the code element.

* * * * *